United States Patent [19]
Leblond et al.

[11] 3,909,338
[45] Sept. 30, 1975

[54] APPARATUS FOR APPLYING AN APEX STRIP TO A BEAD RING

[75] Inventors: Jean R. Leblond; Jacques P. Verhulst, both of Compiegne, France

[73] Assignee: Uniroyal (France), Clairoix, France

[22] Filed: Nov. 1, 1973

[21] Appl. No.: 411,966

[30] Foreign Application Priority Data
Nov. 22, 1972   France .............................. 72.41476

[52] U.S. Cl. ................ 156/422; 156/123; 156/136; 156/394 R; 156/398; 156/420
[51] Int. Cl.² ..................... B29H 17/10; B29H 17/32
[58] Field of Search ........... 156/110, 123, 124, 131, 156/132, 134–136, 394, 398, 399, 403, 422, 460, 185, 193, 446, 481, 530, 414–420

[56] References Cited
UNITED STATES PATENTS

| | | | |
|---|---|---|---|
| 1,651,735 | 12/1927 | Shively | 156/422 |
| 1,732,776 | 10/1929 | Shively | 156/136 |
| 1,759,669 | 5/1930 | Stevens | 156/136 |
| 1,944,768 | 1/1934 | Stevens | 156/136 |
| 3,051,221 | 8/1962 | Strozewski | 156/136 |
| 3,434,897 | 3/1969 | Caretta et al. | 156/403 |
| 3,787,263 | 1/1974 | Yonekawa et al. | 156/136 |

*Primary Examiner*—Clifton B. Cosby
*Assistant Examiner*—John E. Kittle
*Attorney, Agent, or Firm*—Philip Sands, Esq.

[57] ABSTRACT

Apparatus for applying an elastomeric strip to a bead ring, the apparatus having a pulley for supporting a bead ring and a unit for advancing the strip to the outer periphery of the bead ring. Other units are provided for cutting the strip to a length corresponding to the circumference of the periphery of the bead ring, and for applying the strip to the periphery of the bead ring. The foregoing abstract is neither intended to define the invention disclosed in the specification, nor is it intended to limit the scope of the invention in any way.

33 Claims, 31 Drawing Figures

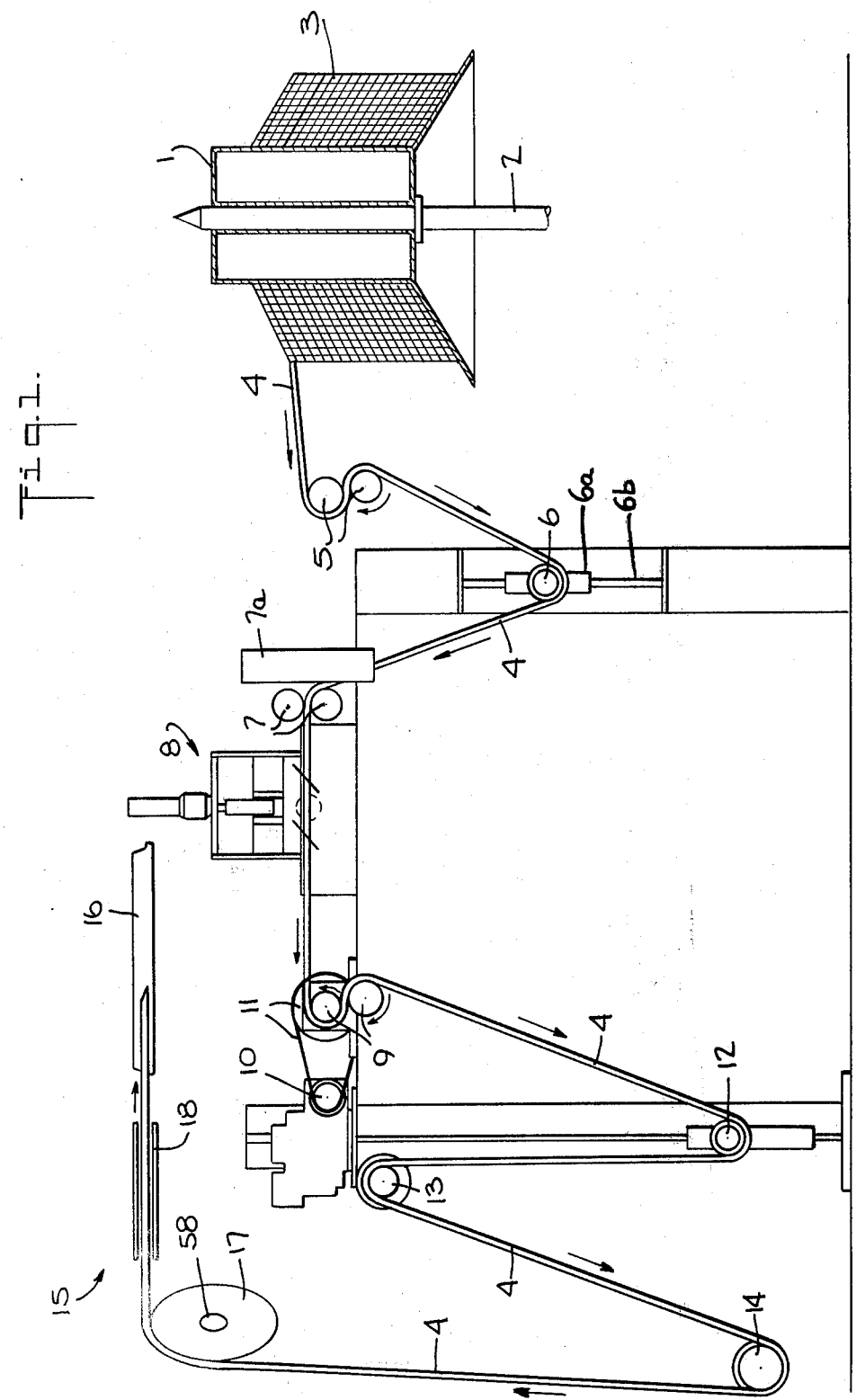

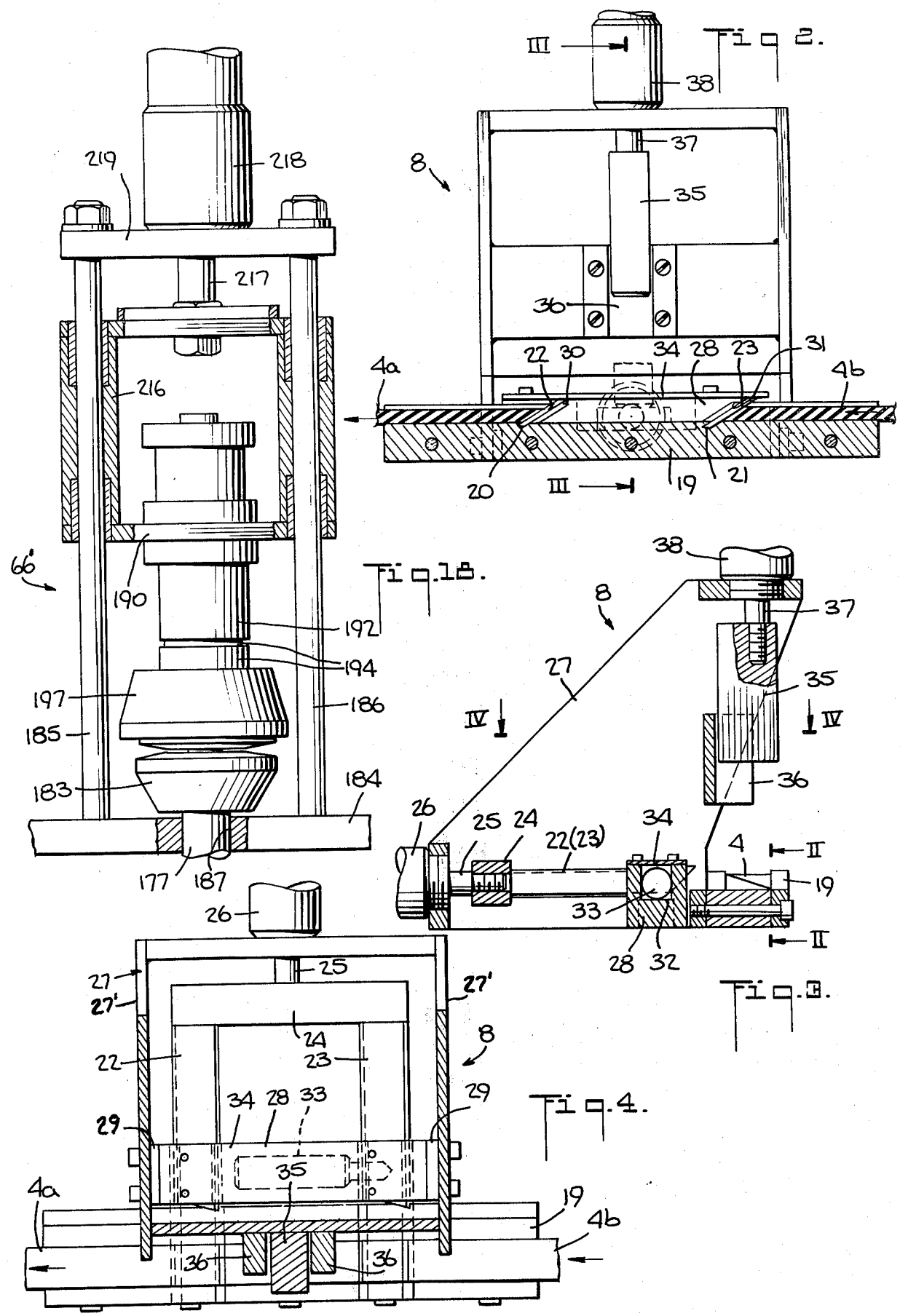

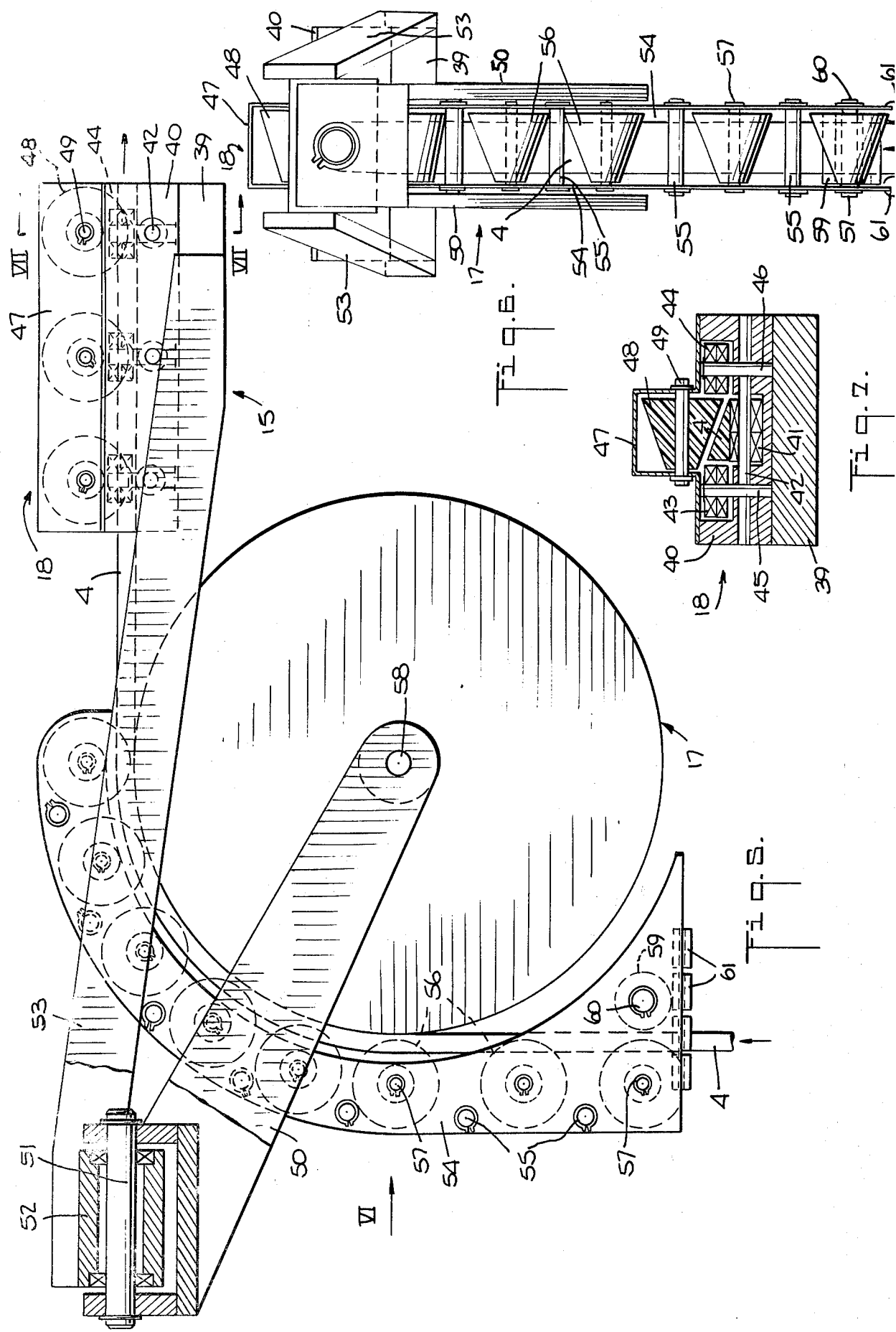

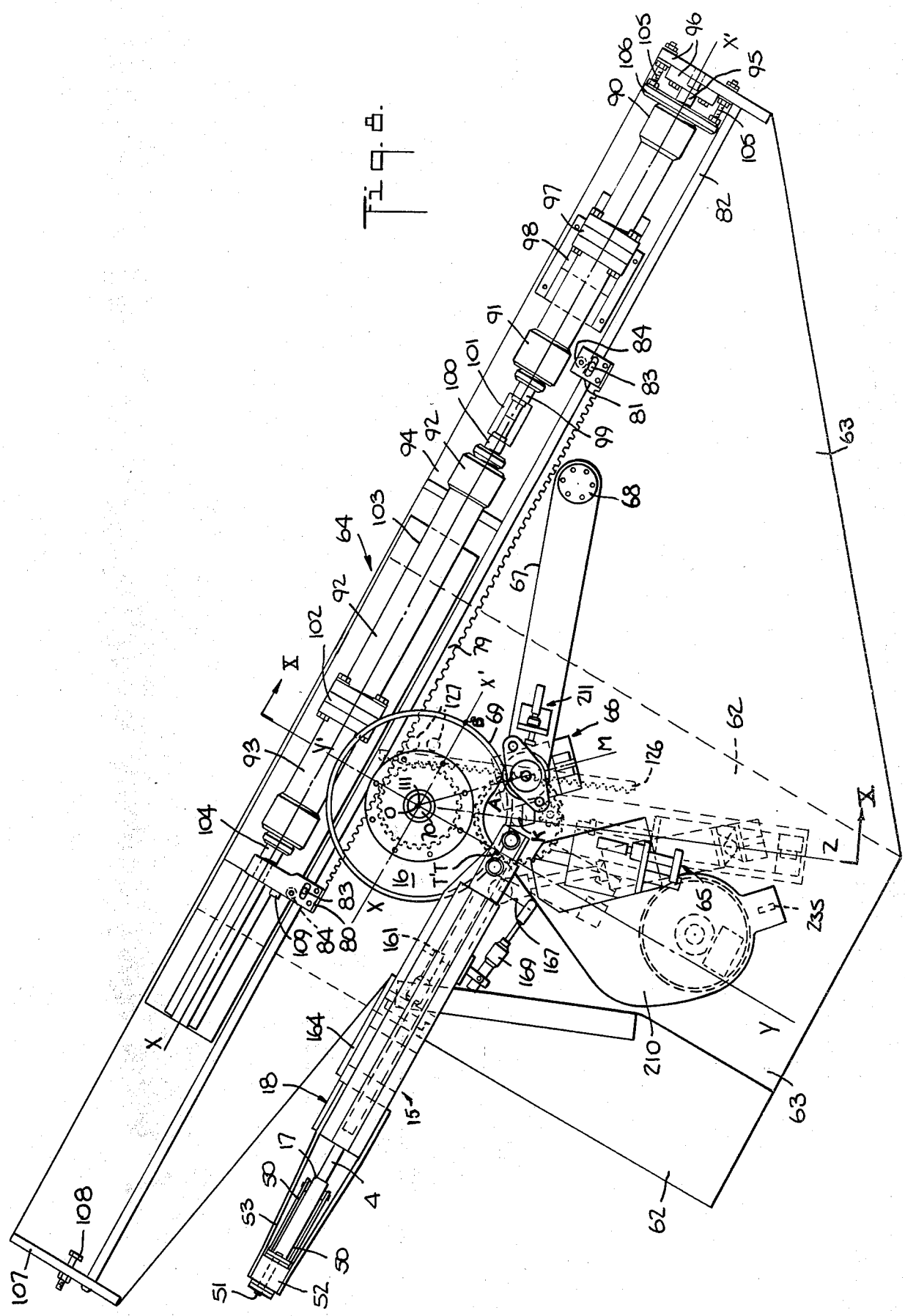

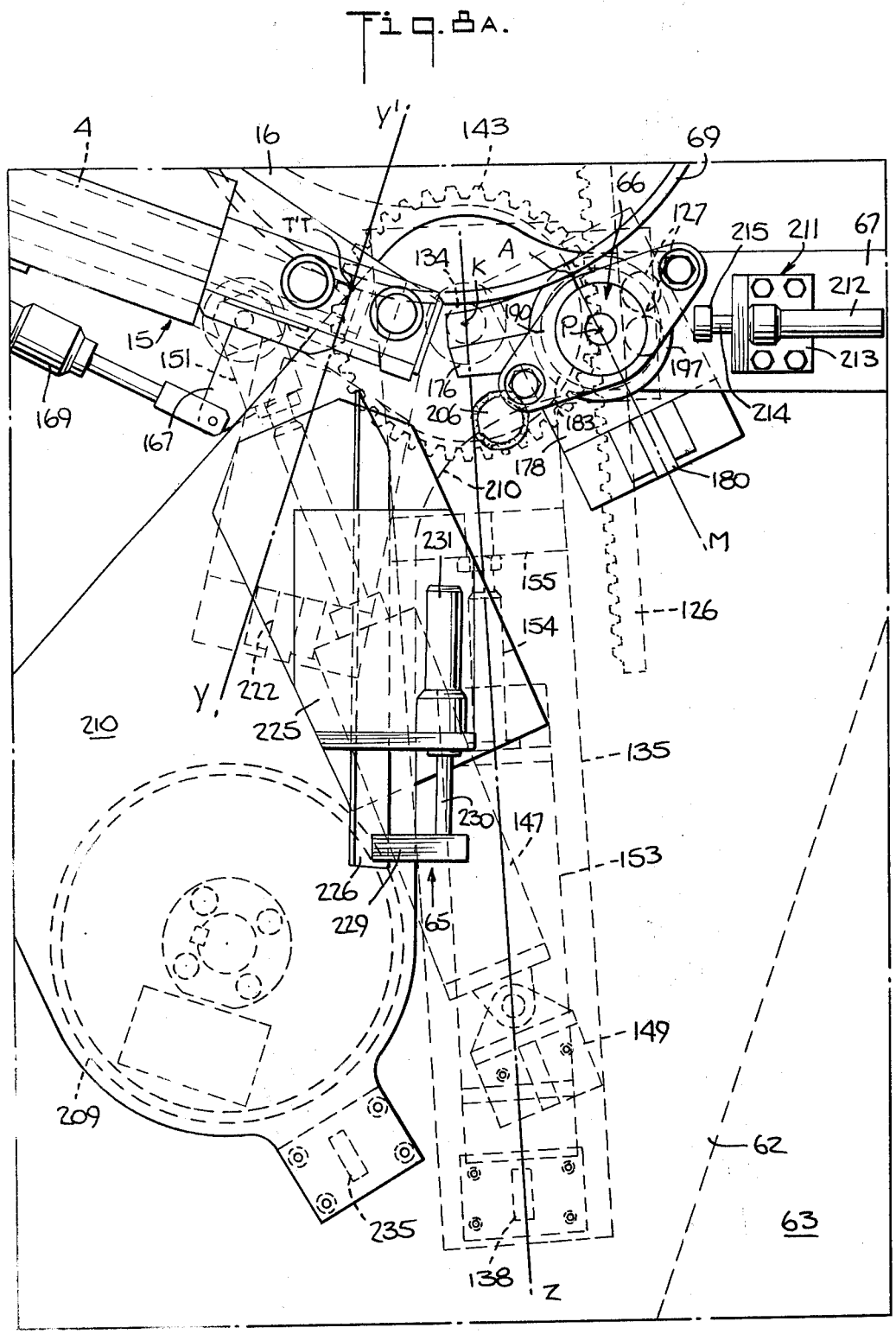

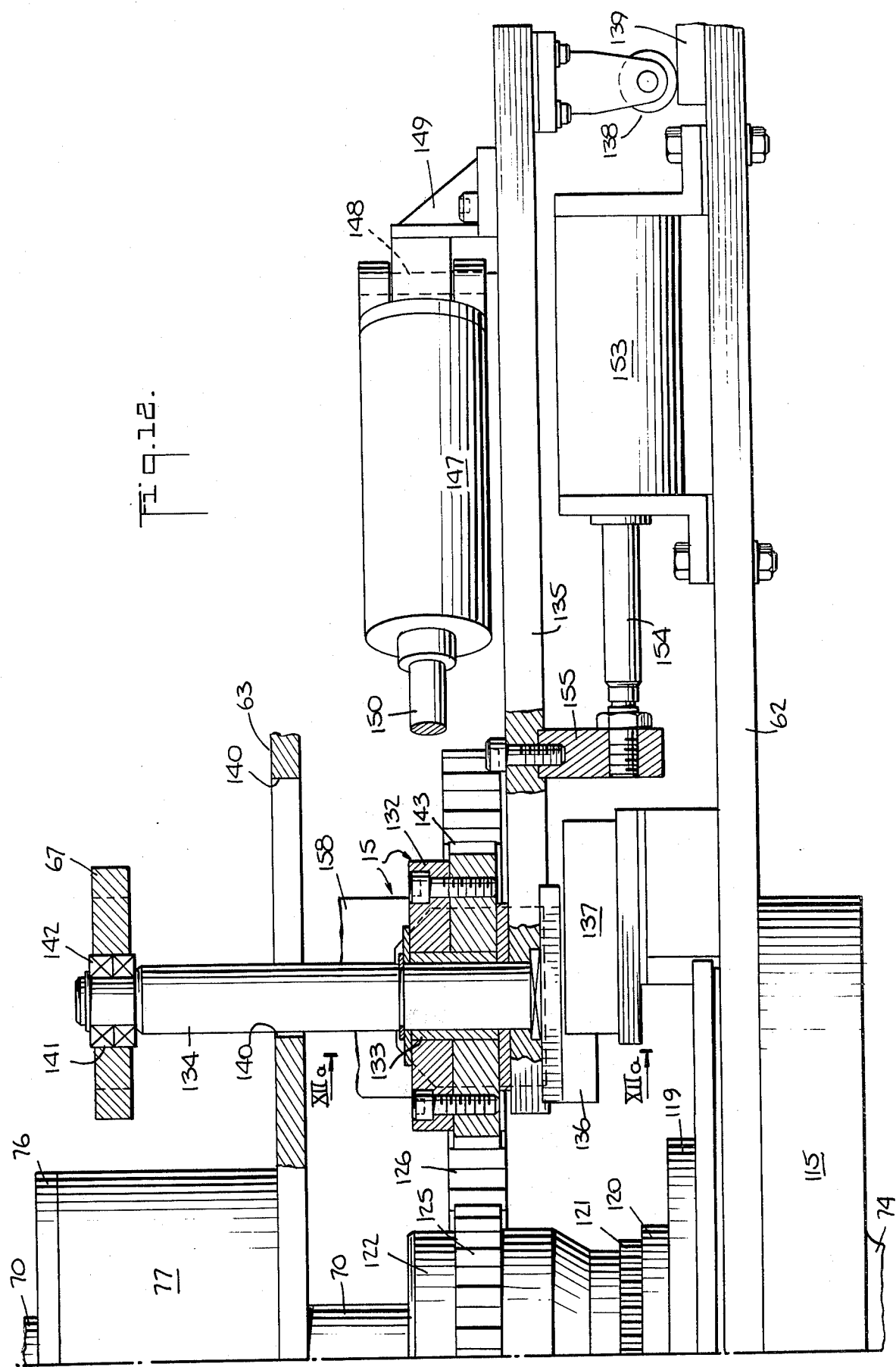

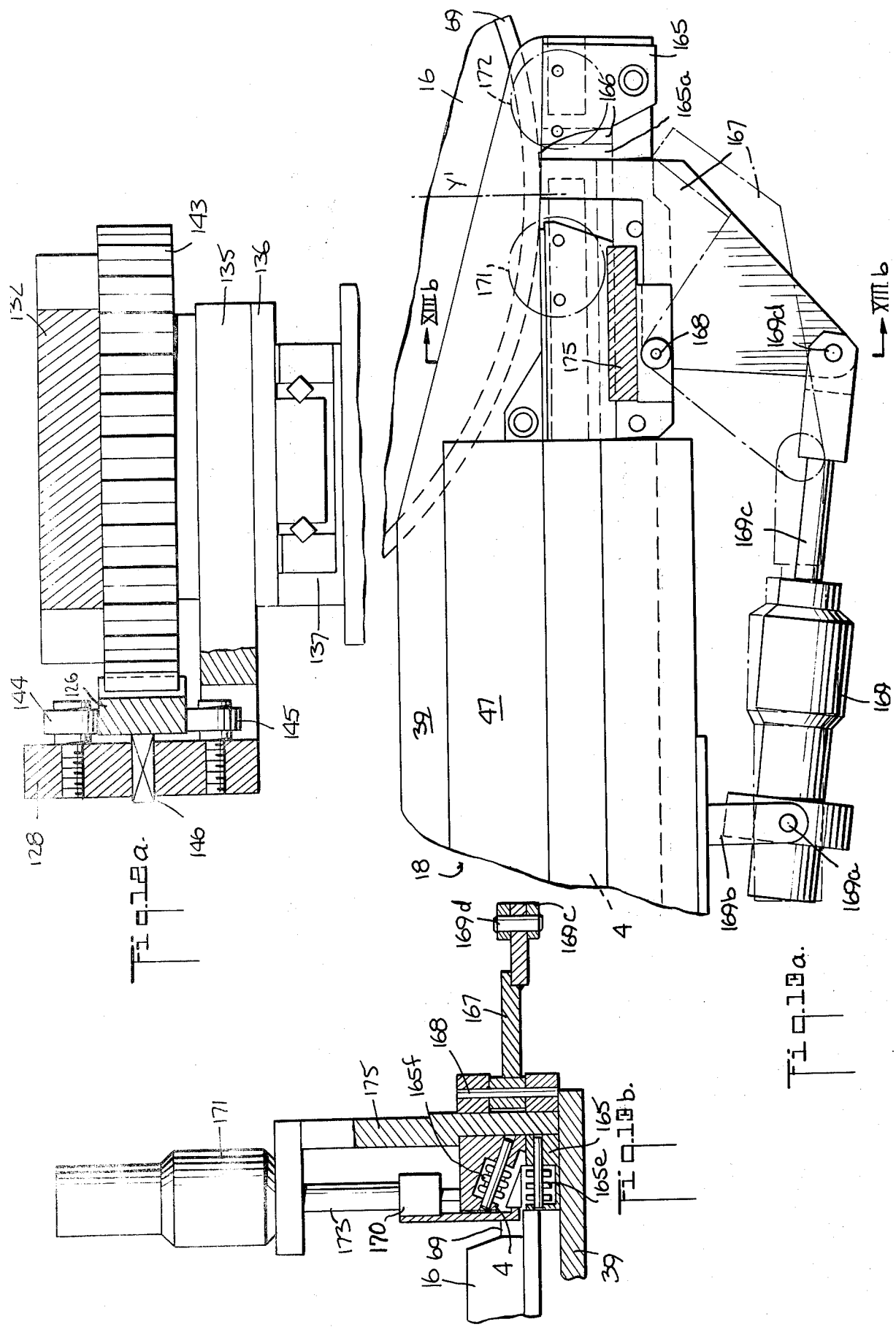

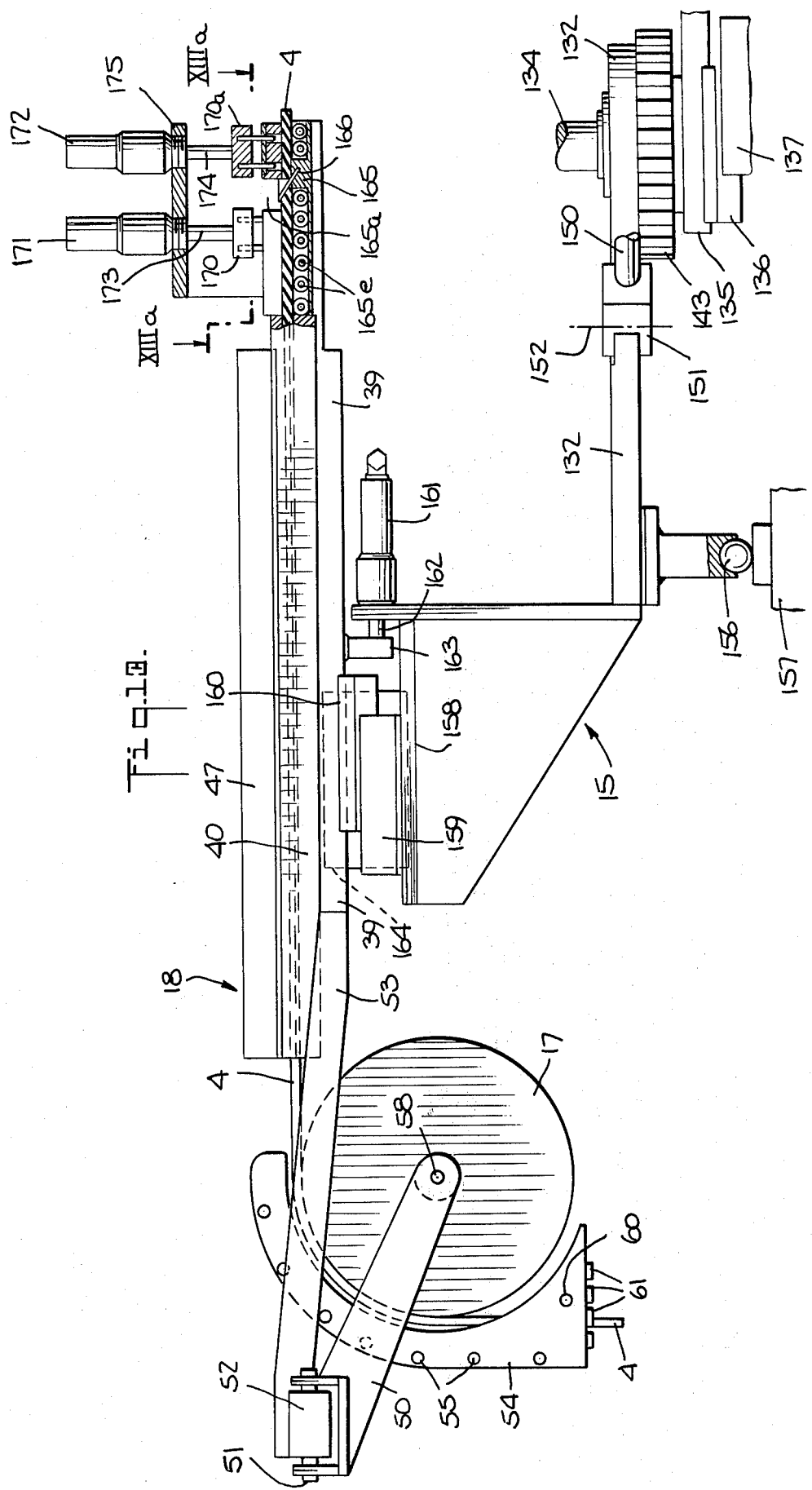

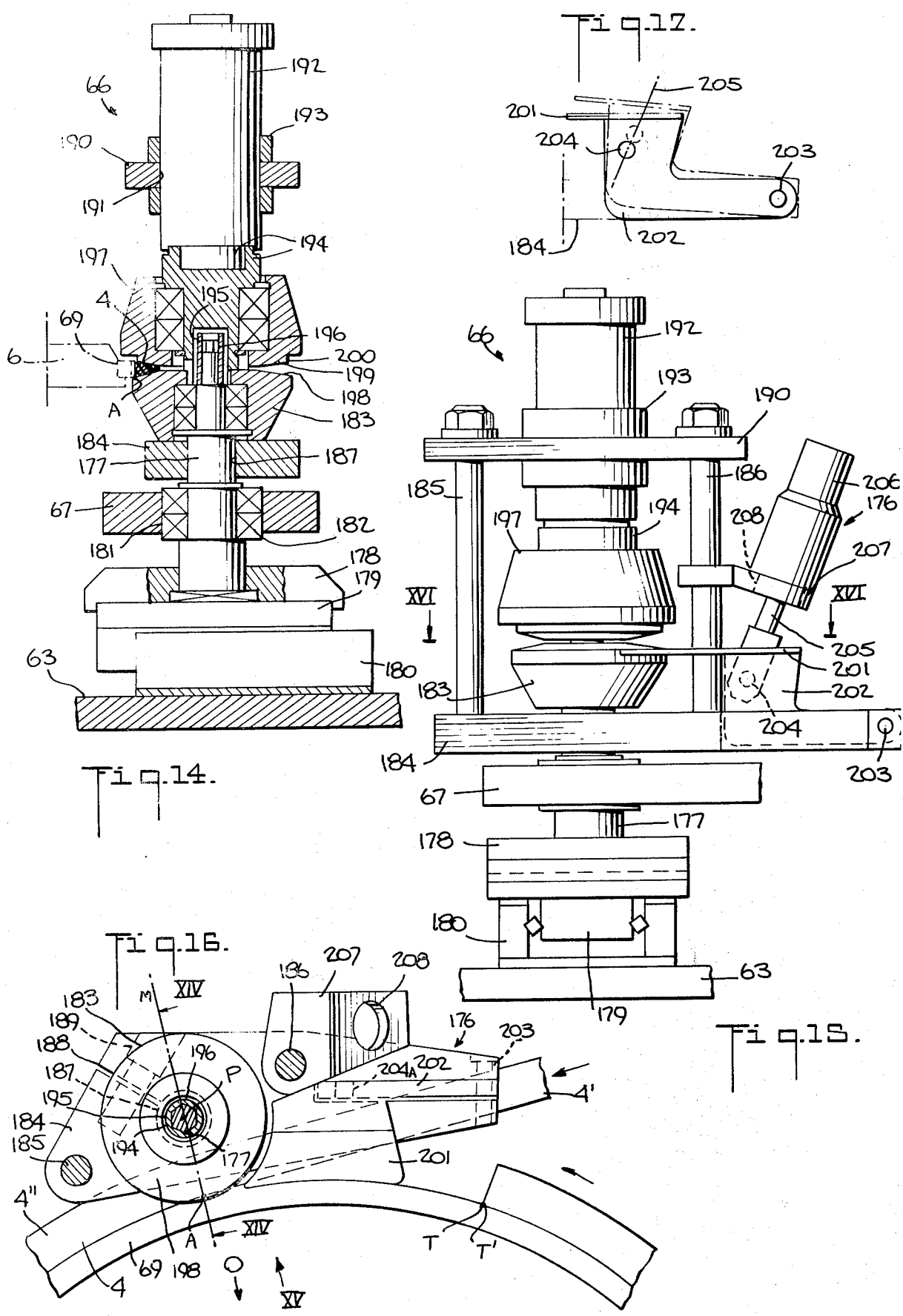

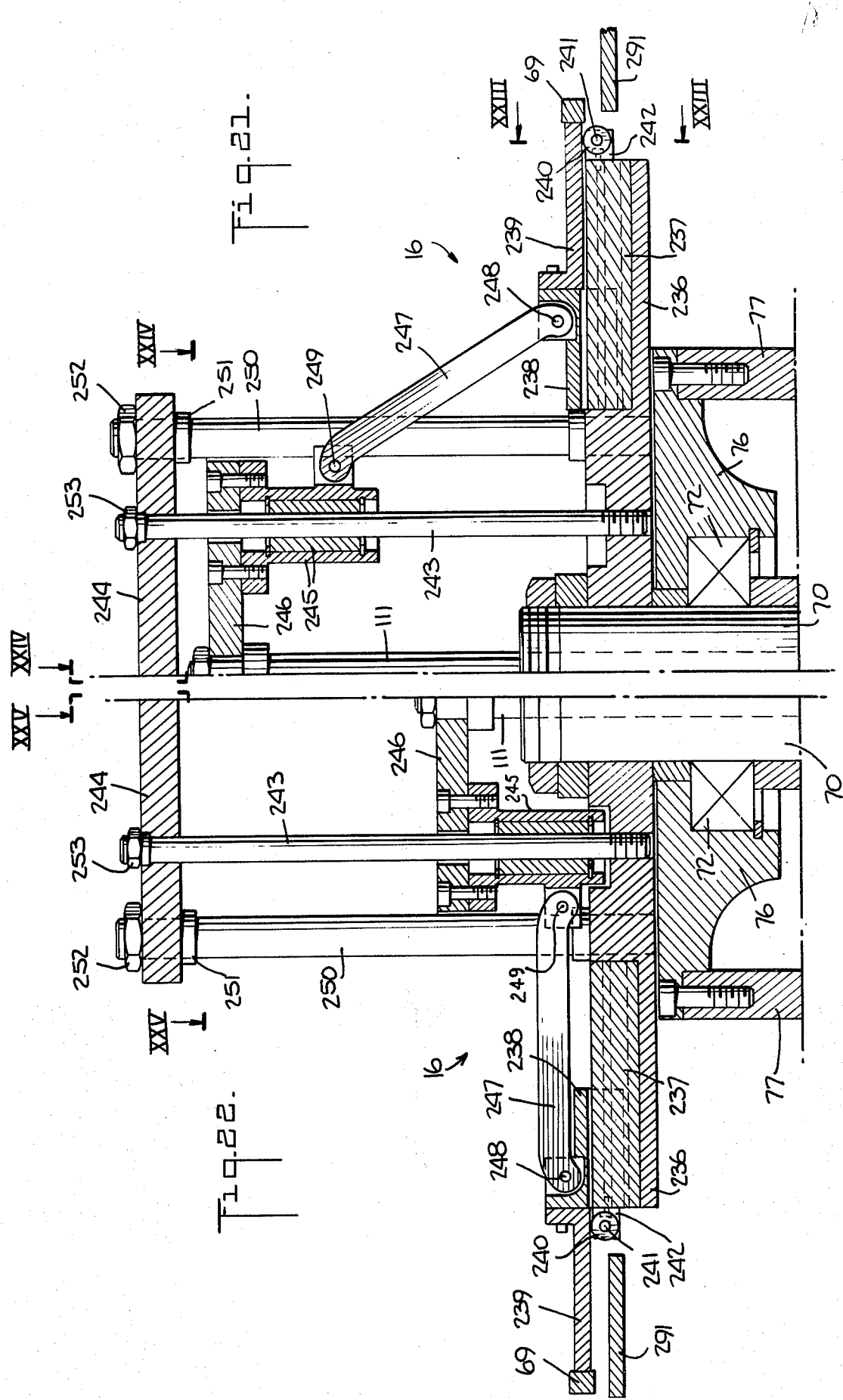

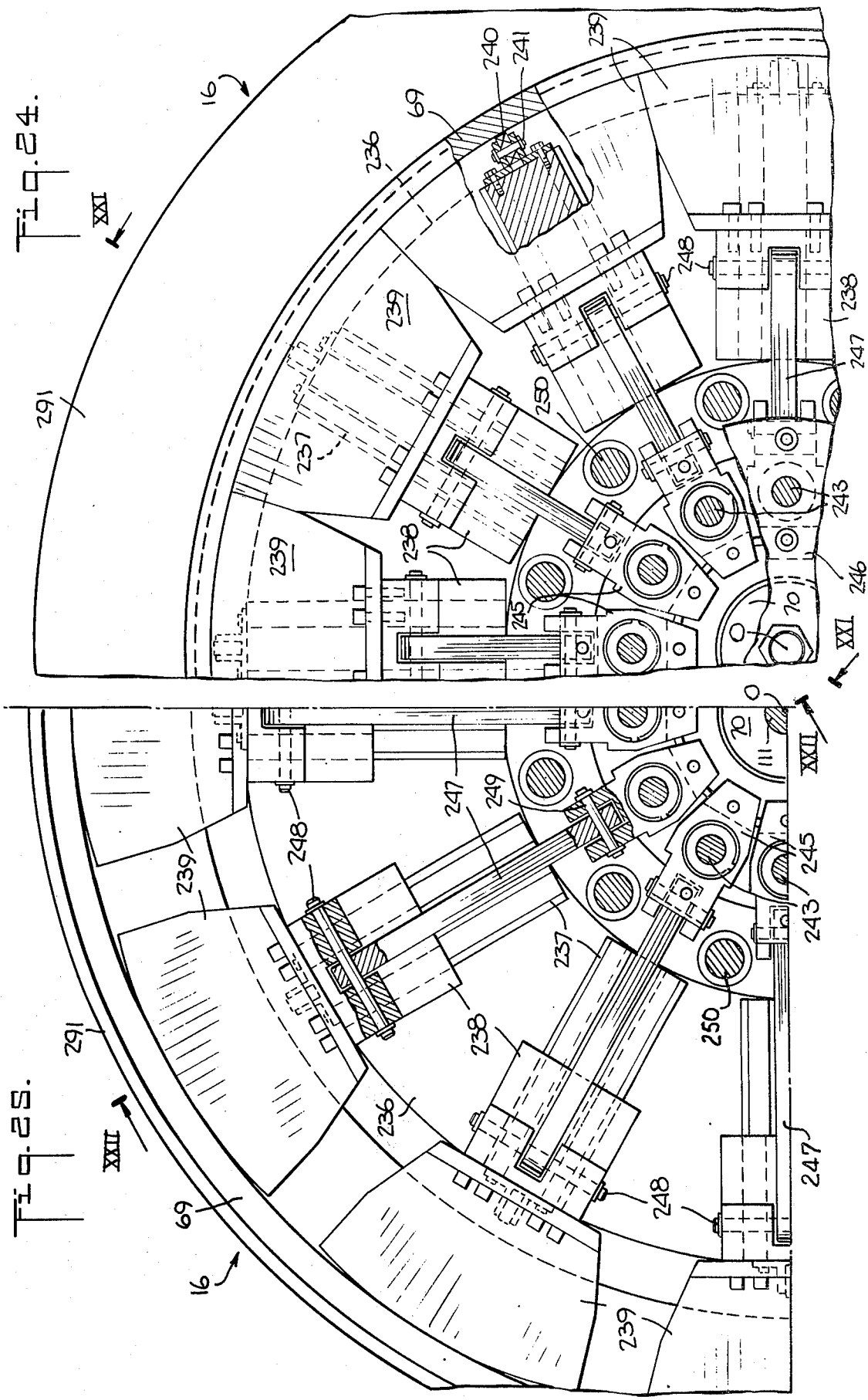

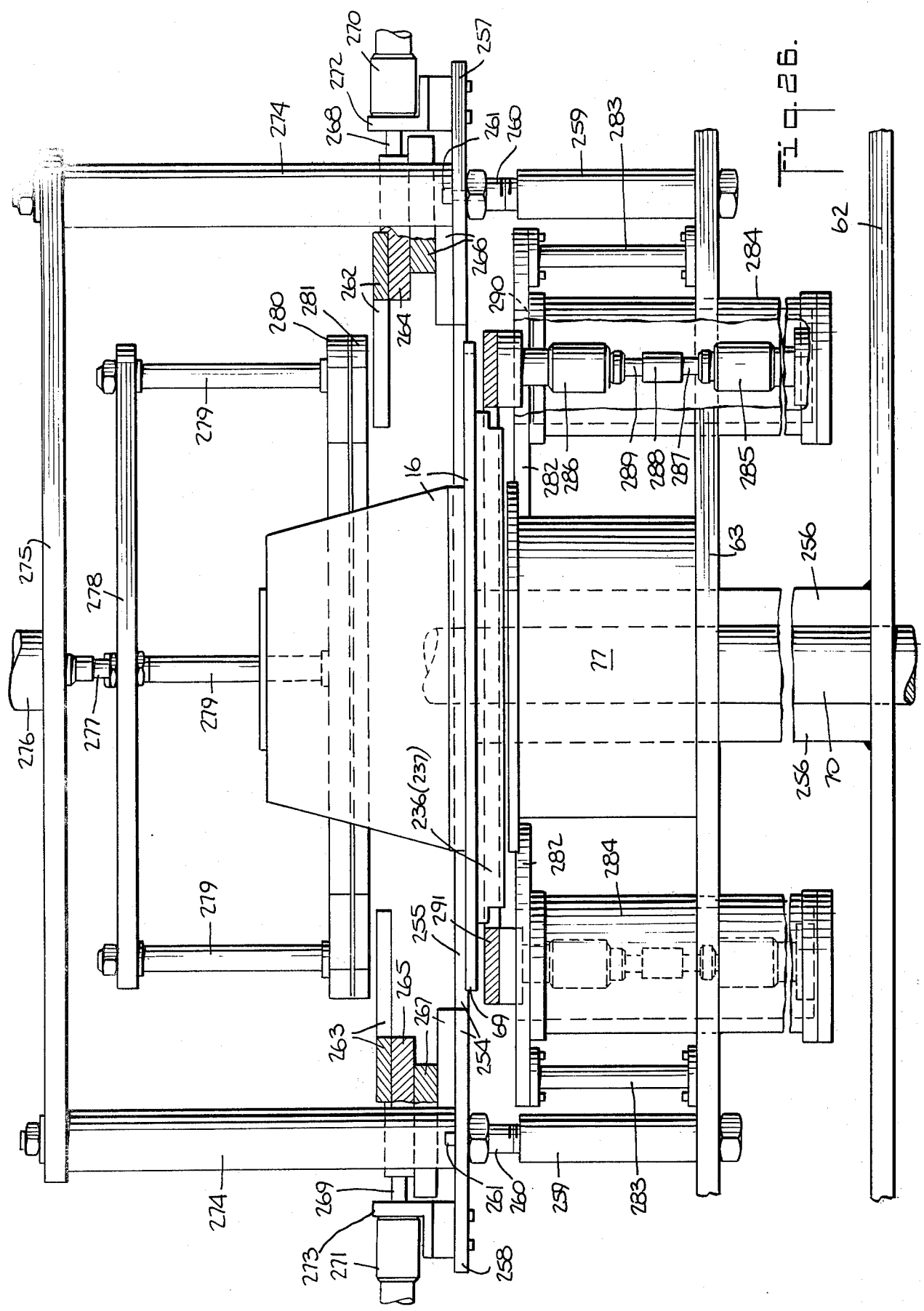

APPARATUS FOR APPLYING AN APEX STRIP TO A BEAD RING

BACKGROUND OF THE INVENTION

The instant invention relates generally to pneumatic tire fabricating devices, and more particularly to a machine for applying or laying elastomeric bead apex or filler strips on carcass-reinforcing annular bead rings for pneumatic tires.

As is well known, a pneumatic tire remains secured upon the rim of a vehicular wheel by means of a pair of metallic annular bead rings. When building a tire carcass, the bead rings are embedded in respective bead portions of the carcass. The bead rings, which are substantially inextensible, define a standardized diameter for each type and size of pneumatic tire. An elastomeric or rubberized apex strip of variable shape and size, for instance of substantially tri-angular cross-section, is applied onto the outer periphery of the bead ring before the latter is disposed into its respective carcass bead portion. The apex strip, thus, constitutes a filler material for filling an annular void between the bead ring and the marginal edge of the carcass folded thereover.

Devices and methods are already known in the art for applying such apex strips to bead rings, but these necessarily involve a substantial number of manual operations which are time consuming, costly and generally undesirable. The operations involve winding a portion of apex strip onto the bead ring to be covered, severing the strip at a length corresponding to the circumference of the bead ring and joining the two opposite ends of the strip, for instance by cementing, welding, or similar means.

The prior art machines have the attendant disadvantage of requiring a relatively long period of time to perform a strip application cycle with the necessary precision. Moreover, such known machines do not entirely satisfy certain requirements and conditions which must be met and which are imposed by 1. the heterogeneous composition of the rubber mixture of the apex strip;
2. the necessity of not stretching the strip prior to and during its application to the bead ring, e.g. since the apex strips are manufactured either in the form of a continuous elongate strip by means of extrusion, or in the form of a sheet having parallel apex strips separated by scored lines and produced by a calender or the like, the initial winding of the apex strips into a coil on a supply spool or the like does not guarantee that the apex strip will not be subjected to inadvertent stretching or rupture when applied to the bead ring;
3. the production size changes of the various standard bead ring diameters;
4. the change from a continuous linear advancement of the apex strip to a discontinuous and circular application thereof to the bead ring; and
5. the necessity to sever the apex strip "to length" with precision to achieve a high quality butt weld at the overlapping strip ends.

SUMMARY OF THE INVENTION

Accordingly, a principal object of the present invention is to provide a machine which obviates the above-mentioned disadvantages and which satisfies the foregoing requirements and conditions. To this end, the machine in accordance with the present invention comprises: a rotary, radially expansible and contractable, bead ring-carrying pulley intermittently rotated by a reversible indexing device; an apex strip advancement and application device for applying an indefinite continuous portion of the apex strip substantially tangentially to the bead ring on the pulley; a system for synchronizing the rotation of the bead ring-carrying pulley and the approach of the strip application device; a device for cutting the apex strip to a prescribed length and chamfer; and a device for guiding the apex strip against the bead ring-carrying pulley, and the chamfered ends of the severed strip into mutually overlapping relation on the bead ring carried by the pulley. The bead ring-carrying pulley which is radially expansible and contractable, thus, can accommodate all bead rings of presently standardized diameters, for instance between 332 and 408 milimeters.

The pulley is mounted on a rotary vertical main shaft that is driven by the indexing device. The apex strip application device is pivotally mounted on a translatory vertical spindle, as are the devices for cutting and guiding the apex strip so that they may be moved into and out of operative association with the bead ring-carrying pulley. It should be pointed out that the vertical orientation of the axis of rotation of the pulley and the respective movements of the elements associated therewith may be modified and still remain within the spirit and scope of the invention.

The machine in accordance with the invention is of relatively simple and inexpensive nature, has a high capacity and production rate, is efficient, precise and dependable, and is in general an improved and highly automatic machine.

BRIEF DESCRIPTION OF THE INVENTION

The invention will be better understood, and other objects, characteristics, details, and advantages thereof will become more apparent upon reading the following detailed description and upon reference to the drawings in which:

FIG. 1 is a simplified schematic side view of the continuous apex strip supply system of the machine in accordance with the invention;

FIG. 2 is a fragmentary, partial cross-sectional, elevational, larger scaled view, taken along line II—II of FIG. 3, of the apex strip cutting and welding device of the supply system;

FIG. 3 is a fragmentary, partially cross-sectional view taken along III—III in FIG. 2;

FIG. 4 is a fragmentary, partially cross-sectional view taken along line IV—IV in FIG. 3;

FIG. 5 is a fragmentary, partially cross-sectional view of an apex strip guide assembly of the supply system;

FIG. 6 is a profile view of the guide assembly as observed in the direction of the arrow VI in FIG. 5;

FIG. 7 is a cross-sectional view taken along line VII—VII in FIG. 5;

FIG. 8 is an overall top plan view of the machine, in smaller scale, illustrating various principal elements of the machine in their relative operating positions at the beginning of an apex strip application cycle;

FIG. 8a is an enlarged fragmentary plan view of the central portion of the machine illustrated in FIG. 8;

FIG. 12 is an enlarged, fragmentary, partially cross-sectional view taken along line XII—XII in FIG. 9a, illustrating a vertical pivot spindle, principal pivotal arms associated therewith, and power cylinders or jacks for effecting translatory movement of the spindle and pivotal movement of the arms;

FIG. 12a is an enlarged, partially cross-sectional view taken along line XIIa—XIIa in FIG. 12, illustrating the meshing relationship of the floating toothed rack with a pinion of one of the pivotal arms;

FIG. 13 is a side elevational view on a smaller scale of the aforementioned apex strip guide assembly, and its association with one of the pivotal arms and an apex strip cutting assembly;

FIG. 13a is an enlarged, fragmentary, top sectional view, taken along the line XIIIa—XIIIa of a unit having a pivotal finger movable into and out of engagement with the apex strip for applying the leading end of the strip to the bead ring;

FIG. 13b is a partial cross-sectional view taken along line XIIIb—XIIIb in FIG. 13a;

FIG. 14 is an enlarged, fragmentary, cross-sectional view, taken along line XIV—XIV in FIG. 9a, illustrating a pressure guide for securing the two opposite chamfered ends of the apex strip to one another;

FIG. 15 is a fragmentary, elevational view illustrating the pressure guide as observed along line XV—XV in FIGS. 9a and 16;

FIG. 16 is a top view of the pressure guide taken along line XVI—XVI in FIG. 15, and an associated apex strip lifting device for lifting the trailing end of the strip after chamfering, upon termination of the application of the strip to the bead ring;

FIG. 17 is a side view of the apex strip lifting blade;

FIG. 18 is a fragmentary, partial cross-sectional view of a modification of the pressure guide;

FIG. 21 is a fragmentary, partial cross-sectional view in enlarged axial half-section, taken along line XXI—XXI in FIG. 24, illustrating the expansible, contractible, bead ring-carrying pulley in a contracted condition of minimum diameter;

FIG. 22 is a view similar to FIG. 21, taken along line XXII—XXII in FIG. 25, illustrating the pulley in an expanded condition of maximum diameter;

FIG. 24 is a fragmentary, one-quarter sectional, top view of the pulley in reduced scale and taken along line XXIV—XXIV in FIG. 21;

FIG. 25 is a view similar to FIG. 24, but taken along line XXV—XXV in FIG. 22;

FIG. 26 is an elevational, fragmentary, front view of a device for applying a bead ring to the pulley.

DETAILED DESCRIPTION OF THE INVENTION

Strip Supply Unit

Figure 9:
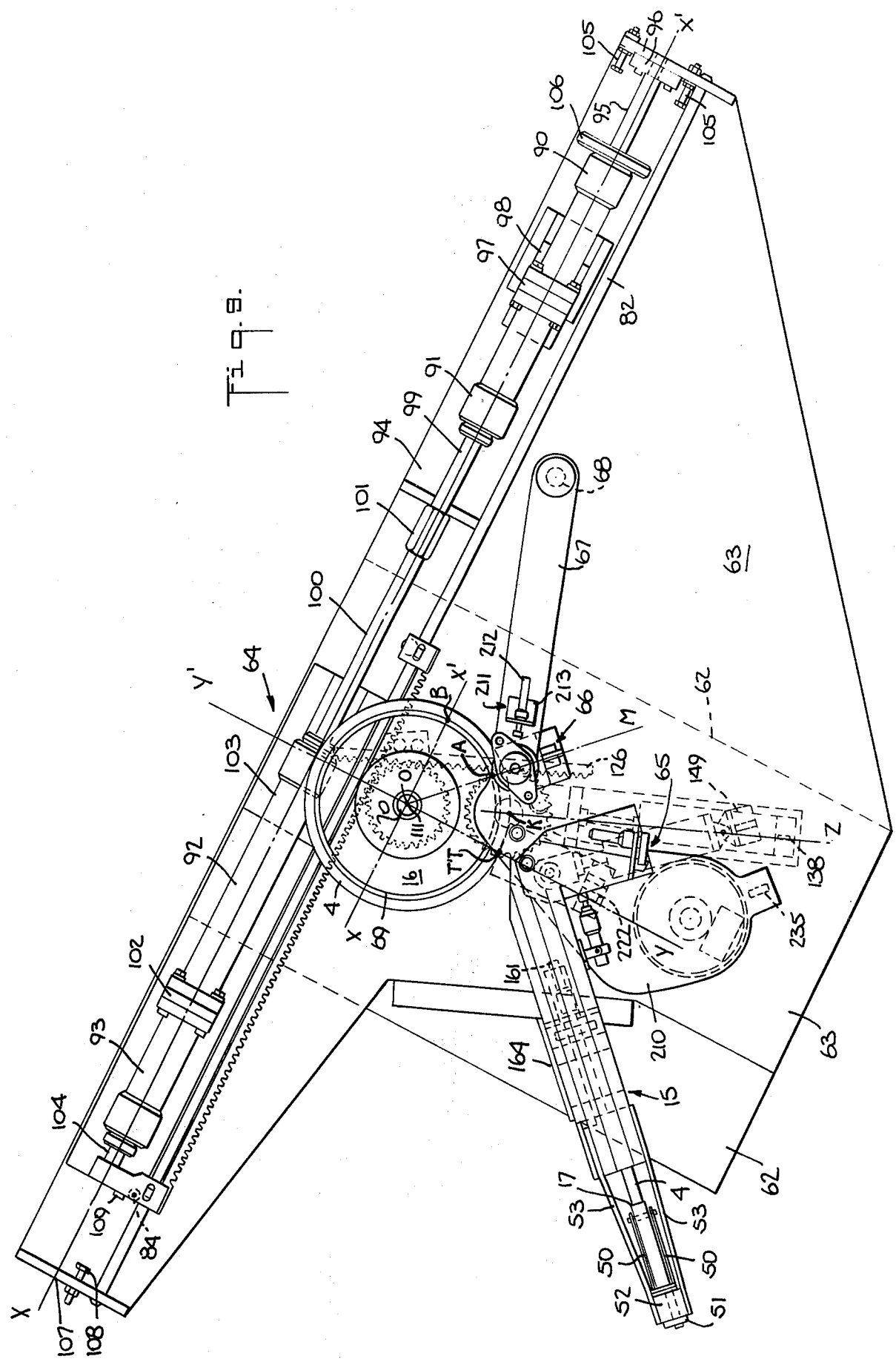
FIG. 9 is a view similar to FIG. 8, but illustrates the various principal elements of the machine in their relative operating positions after one complete revolution of the bead ring-carrying pulley during the application of the apex strip.
Figure 9A:
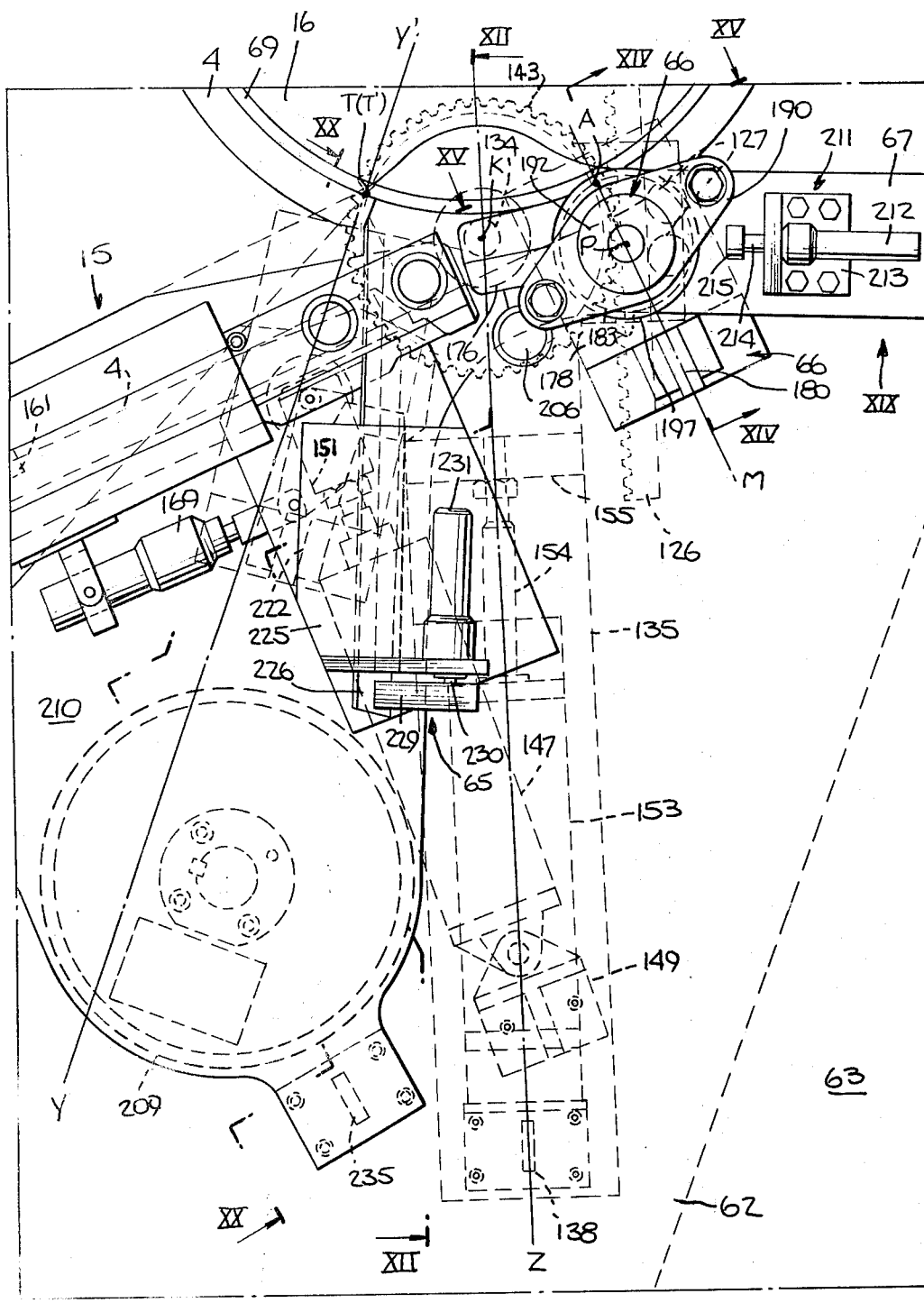
FIG. 9a is an enlarged fragmentary plan view of the central portion of the machine illustrated in FIG. 9.

The apex strip machine, in accordance with the present invention, is supplied with an apex strip by means of an assembly schematically illustrated in FIG. 1. According to a preferred mode of the invention, the apex strip is initially in the form of a rubber sheet produced by a calendering device or the like. The sheet has parallel strips longitudinally juxtapositioned contiguously and joined side by side along their respective longitudinal edges. The adjacent strips are separated by scored lines permitting each to be torn from the others. Each strip has a preferably right-triangular cross-section. The sheet is enwound in the form of a coil onto a cylindrical spool 1 having a frusto-conical end flange. The spool 1 is freely journaled on a shaft 2 for rotation relative to the latter. A conventional braking mechanism (not shown) frictionally or by other means retards the rotation of the spool 1 so as to maintain a desired tension on the strips as they are unwound from the spool.

The apex sheet is coiled on the spool 1 to form a cylindrical roll 3 having a lower concave frusto-conical base and an opposite convex upper end portion. Each strip may be unwound from the spool 1 from a condition of maximum diameter of the roll 3 to a condition of minimum diameter of the latter which corresponds to the diameter of the spool 1. In the course of being unwound, each strip is torn from the strip immediately therebelow along the longitudinal scored line separating them.

Each strip separated in this fashion is denoted by reference character 4 and is advanced by a pair of drive rollers 5 having opposing complementing surfaces corresponding to the triangular cross-section of the strip 4 which is interpositioned and advanced therebetween. The drive rollers 5 are preferably positioned in the immediate proximity of the spool 1 and are intermittently rotated in order to jerk and tear off the upstream apex strip portion still on the roll 3 along its associated scored line. The strip 4 is thereby subjected to tension only over a short length thereof and only during the very brief period that it is torn off from the remainder of the roll 3. As a result of the intermittent tearing operation over a short length of apex strip, there are substantially obviated certain stip-handling and strip-stretching problems customarily faced due to the heterogeneity of the rubber mixture of the apex strip.

The apex strip 4 is then advanced beneath a weighted roller assembly 6 so as to support and be subjected to a preferred degree of tension by the roller assembly 6. The assembly 6 includes a slide shoe 6a which is freely slidable upon a vertically oriented post 6b. The apex strip 4 is then advanced to an edge guiding vertical axis oriented roller 7a, then to and between a pair of idler guide rollers 7, and then to a cutting and welding unit 8 described in more detail below and illustrated in FIGS. 2–4. The cutting and welding unit 8 is designed to chamfer and join the trailing and leading edges of two successive strips unwound from the roll 3.

The apex strip 4 is then advanced to and between a pair of feed rollers 9, the upper one of which is a drive roller and the lower one of which is a driven idler roller. The feed rollers 9 are independent of the rolling 5. The driven upper roller is acutated by a transmission-controlled motor, for instance an electric motor 10, and a belt and pulley unit 11, possibly via a speed reducer or the like. The apex strip 4 is then advanced tgo a second weighted roller assembly 12 similar to that of the assembly 6 but having preferably a greater vertical stroke. The strip 4 is then advanced to and over an upper idler roller 13 and to and under a lower idler roller 14. The strip 4 is now in a condition ready for advancement to a bead ring-carrying pulley 16 via a strip presenting device 15 having an osciallating pulley unit 17 and a slidable roller unit 18 illustrated in greater detail in FIGS. 5 to 7.

Cutting and Welding Unit

The aforementioned cutting and welding unit 8, illustrated in FIGS. 2 to 4, comprises a horizontally disposed guide or base 19 upon and along which the apex strip 4 is adapted to slide. A pair of spaced, parallel, slotted channels 20, 21 each lying in a respective plane inclined relative to the base 19 are provided for accommodating respective knives 22, 23. The knives are endwise shiftable transversely of the base 19 for chamfering the trailing and leading edges of successive strips 4a and 4b, respectively, advanced from the roll 3. The cutting edge of each of the knives 22 and 23 is inclined rearwardly thereof at an angle of preferably 30°.

An internally threaded coupling member 24 is interposed between and joins detachably each of the knives 22 and 23 to a piston rod 25 of a power cylinder (pneumatic or hydraulic) or jack 26 which acts to shift the knives 22 and 23 transversely of the base 19. The jack 26 is mounted upon a yoke or support member 27, as in the base 19. The leading or cutting edge portions of the knives 22 and 23 are preferably, when fully retracted, each in sliding contact with a stationary heating block 28 which is mounted upon the yoke 27 between the arms 27' of the latter. Thermal insulating plates 29 constituted, for example, of a synthetic material sold under the trade name of Teflon are interposed between the heating block 28 and the arms 27' of the yoke 27.

A pair of inclined, parallel, spaced, knife-guiding slots 30, 31 is provided in the heating block 28 for accommodating the knives 22 and 23. The slots 30 and 31 are respectively aligned with the slots 20, 21 of the base 19. The block 28 also is provided with a central cavity 32 (FIG. 3) for containing an electric resistance heater or heating coil 33 which is concealed by a removable upper cover 34. The knives 22 and 23 are, thus, continuously heated and can be protracted to chamfer the trailing and leading edges of strips 4a and 4b, respectively, when for example the strip 4a has been fully unwound from the roll 3 and the strip 4b immediately therebelow is initially advanced to the device 8 to be joined to the strip 4a. The knives 22 and 23 are commonly inclined relative to the base 19 at an angle of preferably 30° so as to chamfer the strips 4a and 4b in a manner which permits the chamfered portions to overlap one another and present a thickness identical to the remainder of the strips 4a and 4b.

The yoke 27 also supports a movable pressure clamping member 35 for movement toward and away from the base 19 so as to press the trailing and leading chamfered portions of the strips 4a and 4b, respectively, against one another to effect adhesion of one to the other. The strips 4a and 4b are tacky and will, upon application of pressure, readily adhere to one another. The pressure clamping member 35 is constrained within and slidable relative to a vertically oriented guide channel 36. A piston rod 37 actuated by a power cylinder or jack 38 which is affixed to the yoke 27 effects movement of the member 35 toward and away from the base 19.

In operation, the cutting and welding unit 8 is initially in a condition wherein the knives 22 and 23 are retracted or withdrawn away from the base 19, and the pressure clamp member 35 is in a raised position. When strip 4a has been fully unwound from the roll 3 and its trailing end is adjacent the knife 22 (FIG. 2) its advancement is temporarily stopped. The leading end of the next strip 4b is then advanced to the knife 23 (FIG. 2) and its advancement is stopped. The jack 26 then protracts the knives 22 and 23, which are heated, across the base 19 so as to chamfer the strips 4a and 4b. The jack 26 is then actuated in a reverse direction to retract the knives 22 and 23 so that the chamfered ends of the strips 4a and 4b can be moved toward one another, manually or otherwise, beneath the clamp member 35. The jack 38 is then actuated so as to cause the member 35 to descend and press the chamfered ends of the strips 4a and 4b against one another, thereby causing the latter ends to adhere to one another. In order to enhance the adhesion of the chamfered ends to one another, an adhesive may be applied to the latter ends prior to the activation of the jack 38. The clamp member 35 is then returned to its elevated position above the strip resulting from the joined strips 4a and 4b to permit the resultant strip to be advanced for application to a bead ring.

Strip Guiding Unit

Figure 10:
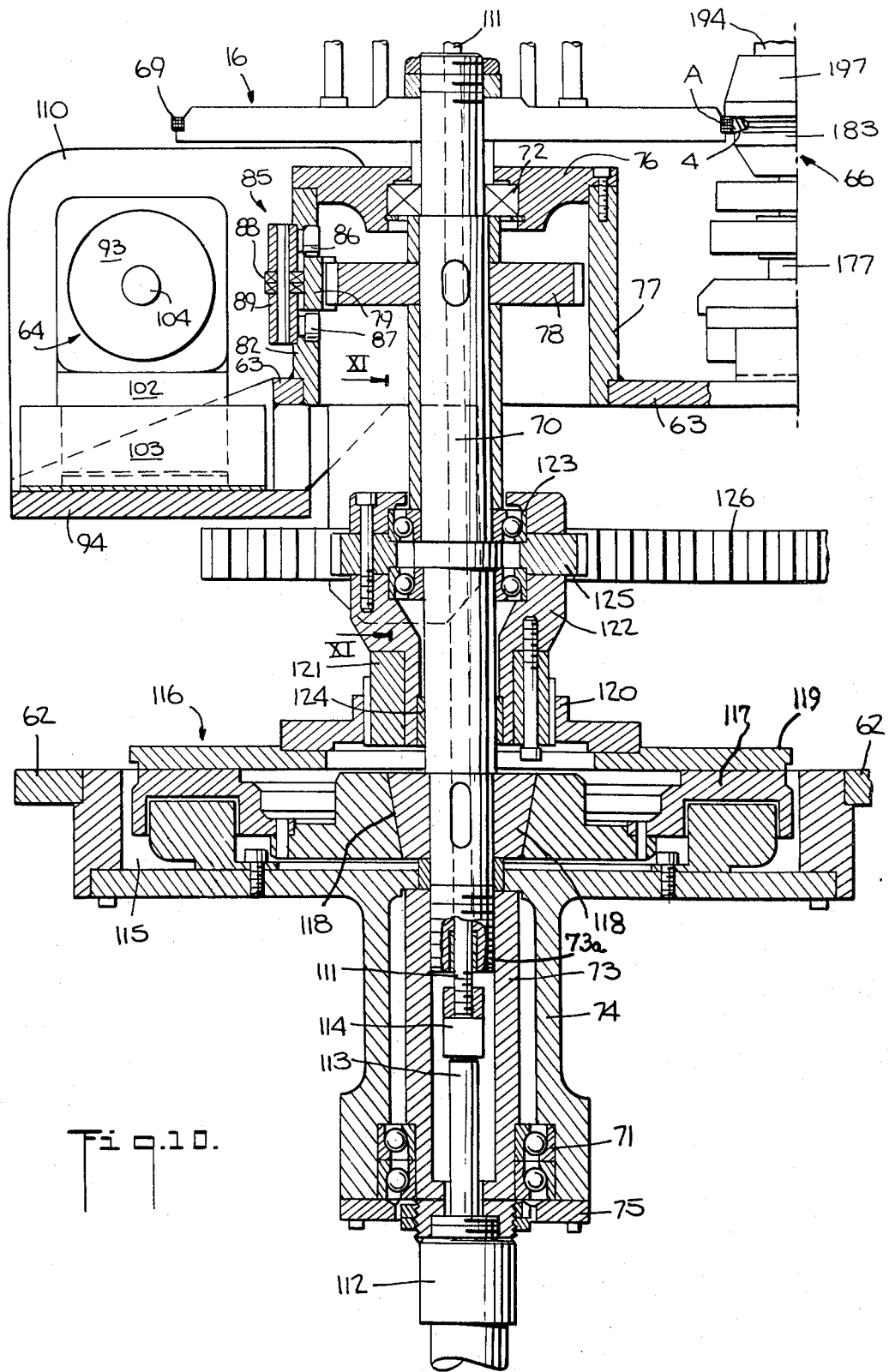
FIG. 10 is a fragmentary, vertical, partially cross-sectional view, in larger scale, taken along line X—X of FIG. 8, illustrating the main shaft of the bead ring-carrying pulley, associated parts and controls of the pulley, and an electromagnetic clutch transmission drive associated therewith.

FIGS. 5 to 7 illustrate the system for guiding the apex strip 4 to the strip presenting unit 15 which acts to apply the strip 4 to the bead ring-carrying pulley 16 (FIG. 10). The unit 15 includes a console 39 at one end portion of which is supported the ocscillating pulley unit 17 and at the other end portion of which is supported the slidable roller unit 18. The unit 18 includes a recessed track member 40 in the form of a trough across the lower portion of which are provided a plurality of spaced idler rollers 41. The rollers 41 are mounted on pins 42. Communicating with the recess provided in the track member 40 are a plurality of rollers 43 and 44 which have vertical axles or pins 45 and 46, respectively. The strip 4 thus rests freely upon the rollers 41 and is guided along the sides thereof by the rollers 43 and 44. Above the strip 4 or opposite the lower rollers 41 is disposed an upper detachable member 47 which supports a plurality of frusto-conical, spaced, rollers 48, each idling on a respective pin 49. The conicity of the rollers 48 is complemental to the hypotenuse of the triangular cross-section of the strip 4.

The oscillating pulley 17 at the other end of the console 39 is drivingly mounted between a pair of arms of a bifurcated member 50 which is hingedly supported via a pin 51 and a bearing unit 52 to a pair of arms 53 of the console 39. The bifurcated member 50 is thus adapted to oscillate relative to the console 39 along the axis of the pin 51 which is preferably aligned tangent to the pulley 17. A pair of arcuate edged plates 54 are supported by the arms of the bifurcated member, the plates 54 being coupled with one another by a plurality of spaced bars 55. Between the spaced bars 55 are respective frusto-conical idler rollers 56 each having a conicity complementing the cross-section of the strip 4. The rollers 56 are journaled freely on respective pins 57.

The rollers 56 define, cooperatively with the periphery of the pulley 17, a passageway through which the apex strip reversibly advances while being constrained against the pulley 17. In order to guide the apex strip 4 onto the periphery of the pulley 17, there is provided a cylindrical roller 59, idling on a pin 60, which cooperates with the lowermost one of the frusto-conical rollers 57, and a plurality of vertical axis oriented rollers 61 which guide the opposite sides of the strip 4 into alignment with the roller 59. Thus, the roller 59 and its associated one of the frusto-conical rollers 56 complement the triangular cross-section of the strip 4 and together with the rollers 61 prevent twisting and misalignment of the strip 4 relative to the pulley 17.

Bead Ring Control Unit

The machine in accordance with the invention for controlling the bead ring is illustrated in plan view in FIGS. 8, 8a, 9 and 9a. However, for purposes of clarity, the system for supplying and advancing the strip 4 thereto has been omitted. The bead ring control unit comprises a stationary frame or chassis defining a lower platform 62 and an upper platform 63 spaced above the lower platform 62. The frame or chassis supports the strip presenting unit 15, the bead ring-carrying pulley 16, which as will be described hereinbelow has an adjustable periphery, an indexing unit 64 for effecting selective rotation of the pulley 16, a cutting unit 65 for severing the strip 4 after it has been wound upon the bead ring, a strip-pressuring unit 66 for pressing the strip 4 against the bead ring as the strip 4 is applied to the bead ring, and a pivotal control arm 67 supported on the upper platform 63 my means of a pin 68 for synchronizing the various movements of the strip applicating unit 15, the cutting unit 65 and the strippressuring unit 66 relative to the pulley 16 upon which is predisposed a bead ring 69.

Bead Ring-carrying Pulley and Indexing Unit

As illustrated in FIG. 10, the bead ring-carrying pulley 16 is fixedly mounted upon the upper end of a substantially vertical rotary drive shaft 70 so as to rotate therewith. The drive shaft 70 is rotatably journaled at its opposite ends, respectively, in a lower bearing 71 and an upper bearing 72. The drive shaft 70 is provided with a lower cylindrical member or sleeve 73 which is threadedly affixed thereto at 73a. The exterior of the sleeves 73 is that portion of the shaft 70 which is directly associated with the lower bearing 71. The lower bearing 71 is mounted in a skirt 74 which is fastened to the lower platform 62 and is closed by a removable cover 75. The upper bearing 72 is mounted inside of a plate 76 which is affixed to a housing 77 integral with the upper platform 63. The drive shaft 70 thus passes freely through the two superpositioned platforms 62 and 63.

Affixed to the drive shaft 70 beneath the upper bearing 72, is a pinion gear 78 which meshes with a toothed rack 79. The rack 79 is operatively associated with the indexing unit 64. The length of the rack 79 is sufficient to effect rotation of the pinion gear 78 and, thereby, the drive shaft 70 and the pulley 16 in excess of one full revolution.

As best shown in FIGS. 8 and 9, the rack 79 is mounted at its opposite ends, respectively, on two carriages 80 and 81 which are supported for movement along a horizontally disposed guide track 82 preferably in the form of a vertical flange extending along one edge of the indexing unit 64. Each of the carriages 80, 81 comprises at least one roller or ball bearing 83 by means of which the carriage rests and travels along the track 82, and at least one lateral guide roller 84 in rolling contact with one side surface of the track 82, for instance the one opposite the side surface at which the rack 79 is situated. The rack 79 is additionally guided and supported by a unit 85 (FIG. 10) which is affixed to the track 82, the unit 85 comprising at least one pair of spaced rollers 86, 87 having horizontal axes and embracing the rack 79 from above and below the latter. The unit 85 further includes a vertical axis oriented roller 88 in rolling contact with one side of the rack 79 opposite the side of which is in meshing association with the pinion gear 78. It is preferable that more than one such group of rollers 86, 87 and 88 be provided to enhance the stability and rolling capacity of the rack 79.

Because of the various synchronized movements of the equipment associated with the pulley 16, the latter cannot be rotated continuously. Thus, there is provided the indexing unit 64 which, at selective intervals, effects intermittent rotation of the pulley 16. Such rotation is effected as the rack 79 is shifted over selected distances which in turn causes the pinion gear 78 and drive shaft 70 to rotate over selective angular extends. The unit 64 may be one of any number of conventional devices used for such purposes. For example, the unit 64 may be a Maltese cross-mechanism, a pawl-and-ratchet mechanism, a rotary turret cam-driven mechanism, or, as preferred herein, a group of power cylinders or jacks arranged in series, the number of jacks corresponding to the number of stops in the indexing cycle. The arrangement of equipment pursuant to the present invention requires four such stops. Thus, four jacks of double-acting (forward-reverse) capacity are provided. The jacks, which are denoted by reference characters 90, 91, 92, 93, are of the cylinder and piston type, and are coaxially aligned substantially horizontally in series in such a way so as to transfer rectilinear movement to one another in succession as each is independently activated.

The indexing unit 64 is mounted on a support or base 94 which is integral with the upper platform 63. The piston rod 95 of the jack 90 is fixedly secured to a vertical end flange 96 integral with the base 94. The cylinder of the jack 90 is, therefore, movable relative to the piston rod 95. The respective cylinders of the jack 90 and 91 are coaxially affixed to one another back to back and to a movable carrier shoe 97 slidably mounted in a guide or track 98 fastened to the base 94. Thus, the cylinders of the jacks 90 and 91 are commonly shifted when the piston rod 95 of the jack 90 is activated. The respective piston rods 99 and 100 of the jacks 91 and 92 are mutually affixed to one another end to end, by means of a coupling element 101 tapped at its opposite ends with screw threads. Likewise, the respective cylinders of the jacks 92 and 93 are affixed to one another end to end and are commonly secured to a movable carrier shoe 102 slidably mounted in a guide or track 103 fastened to the base 94. Thus, the cylinders of the jacks 92 and 93 are movable in unison as the piston rods of the jacks 91 and 92 are activated successively. The movable piston rod 104 of the end jack 93 is fastened to the carriage 80 of the rack 79 in such a way as to effect movement of the latter in a direction parallel to the common longitudinal axis of the four aforementioned jacks. As each jack is activated, the carriage 80, and thereby the rack 79, is shifted over a selected distance, the full extent of movement of the carriage 80 corresponding to the combined individual strokes of the jacks 90, 91, 92 and 93 which result in more than one complete revolution of the pulley 16. The jacks 90, 91 and 92 effect exactly one revolution of the pulley 16.

The terminal flange 96 is suitably provided with at least one and preferably two abutments 105 which are selectively adjustable and provided as a pair of screws engageable by a bumper bar 106 affixed to the mobile cylinder of the jack 90 when the latter cylinder is fully retracted. The base 94 also comprises, at its opposite end, a stationary vertical flange 107 provided with at least one selectively adjustable abutment 108, also in the form of a screw, which is engageable by a corresponding abutment 109 integral with the carriage 80 or with the rod 104 of the jack 93. Thus, the abutments 108 and 109 delimit the extent of travel of the carriage 80 and, thereby, the extent of rotation of the pulley 16. The indexing device 64 is suitably covered with a protective housing 110 or the like (FIG. 10). It will be understood that the four jacks 90–93 which are connected in series can obviously be replaced by any other type of indexing system, as those referred to above or, for instance, by an electromagnetic system for effecting intermittent rotaion of the pulley 16. However, the system of jacks as preferred herein has been determined as being the most effective and precise system for effecting intermittent rotation of the pulley 16. Even the use of a single jack is less precise than the series of jacks utilized herein since the stroke of a single jack cannot be governed precisely when activated only over portions of its full extent.

Referring again to FIG. 10, the drive shaft 70 is preferably hollow and accommodates an axially shiftable rod 111 that is sufficiently long to project at all times from each of the two opposite ends thereof. The upper end of the rod 111 is connected to the expansion and contraction mechanism of the pulley 16 (FIG. 22), as will later be described. The rod 111 at its lower extremity projects into the tubular sleeve 73 and is affixed to a power cylinder or jack 112 (hydraulic or pneumatic) having a piston rod 113 which penetrates the sleeve 73 and is connected to the rod 111 by means of a coupling member 114. The coupling member 114 is of a conventional type which permits the shaft 70 and the rod 111 to be rotated relative to the jack 112 and piston rod 113 which are constrained against rotation.

A housing 115 is integral with the lower platform 62 and contains a clutch 116 comprising an electromagnetically energizable rotor 117. The rotor 117 is affixed to a hub 118 which in turn is fastened to the drive shaft 70 for rotation with the latter. An electromagnetically responsive disc-like member 119 associated with the rotor 117 is affixed to a sprocketed wheel 120 which has teeth along its internal periphery which mesh with and are axially slidable relative to corresponding teeth of a pinion gear 121. The gear 121 is affixed to a hollow sleeve 122 which coaxilly surrounds the drive shaft 70. The sleeve 122 is freely journaled by means of a roller bearing 123 and by means of a bearing 124 on the drive shaft 70 so as to be rotatable relative to the latter. Affixed to the sleeve 122 and surrounding the latter is a pinion gear 125 which is coaxial with the shaft 70. The pinion gear 125 meshes with a rack 126 which slides freely in two tracks, namely a first track 127 which is stationary (FIG. 11) and a second track 128 which is movable (FIG. 12a).

Figure 11:
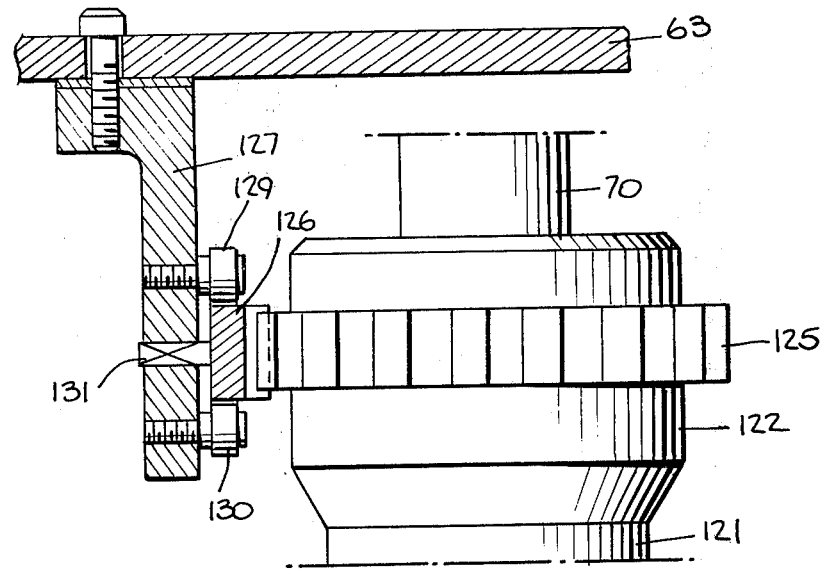
FIG. 11 is a fragmentary, partially cross-sectional view in larger scale, taken along line XI—XI in FIG. 10, illustrating a floating toothed rack meshing with a corresponding pinion of the main shaft of the pulley.
Figure 23:
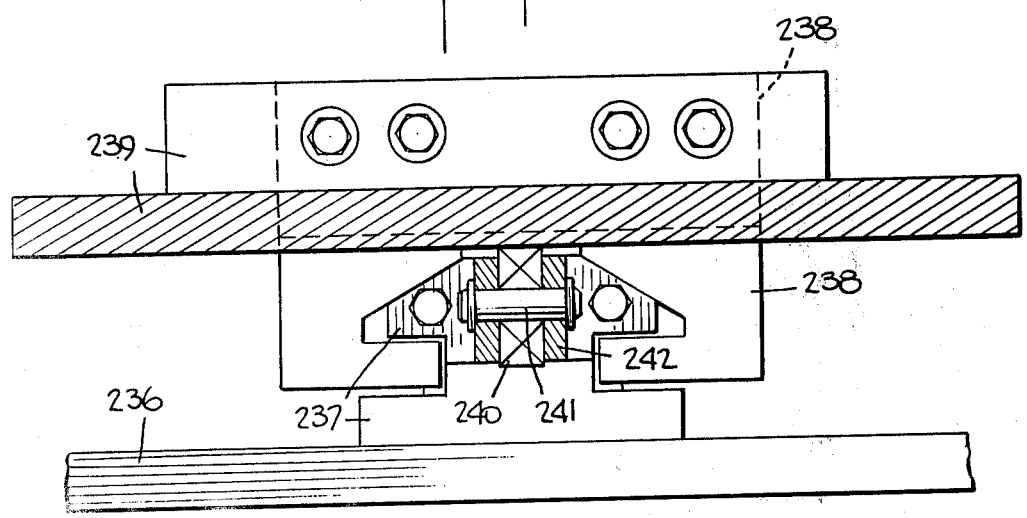
FIG. 23 is a fragmentary, partial cross-sectional view taken along line XXIII—XXIII in FIG. 21, illustrating a guide roller at the end of a guide slide of a radially movable segment of the bead ring-carrying pulley.

As illustrated in FIG. 11, the stationary track 127 is affixed to the lower platform 63 as a vertically oriented leg. A pair of roller assemblies each having a plurality of rollers 129 and 130 embrace the rack 126. Another group of rollers 131 having vertically oriented axes is also provided on the track 127 and engage the untoothed side of the rack 126. Thus, the rollers 129, 130 and 131 permit movement of the rack 126 relative to the stationary track 127. The rack 126 is shifted when the rotor 117 is energized and causes the member 119 to shift downwardly into engagement therewith. Thus, as the shaft 70 rotates, the coupling of the rotor 117 and member 119 causes the gear 121, the sleeve 122 and the gear 125 to similarly rotate, thereby, shifting the rack 126. When the rotor 117 is deenergized, by springs or conventional means not illustrated, the member 119 is elevated relative to the rotor 117 and the gear 121 to permit the shaft 70 to be rotated relative thereto so that the rack 126 is not shifted.

FIGS. 12 and 13 illustrate an assembly which comprises a horizontal pivotal arm 132 rotatably mounted by means of a bearing 133 or the like on a nonrotatable vertical pivot shaft 134. The shaft 134 is fastened at its lower end to an elongated horizontal plate 135 that is integral with a slide shoe 136 or the like slidably mounted in a stationary guide track 137. A vertical axial plane passing through the shaft 134 and which is parallel to the direction of the rectilinear movement of the slide shoe 136 passes through the geometric axis of the drive shaft 70 in such a way that the shaft 134 can be shifted radially of the drive shaft 70 and, therefore, radially of the pulley 16. To this end, the elongated plate 135 includes at its end opposite the shoe 136 a roller or ball bearing 138 which rests and is movable relative to a stationary track 139 integral with the lower platform 62. The vertical shaft 134 passes freely through an elongated aperture 140 formed in the upper platform 63 and through a second elongate aperture 141 formed in the arm 67 (normally of the plane of the drawing in FIG. 12). The upper end of the shaft 134 supports a bearing 142 which slidingly engages the aperture 141 in the arm 67 and permits effective movement of the shaft 134 relative to the aperture 141.

The pivotal arm 132 of the unit 15 fixedly supports a pinion gear 143 which coaxially surrounds the vertical shaft 134 and meshes with the rack 126. The rack 126, thereby, forms a transmission mechanism between the pinion gear 125 of the drive shaft 70 and the pinion gear 143 of the pivotal arm 132. It is contemplated, however, that the rack 126 could be replaced by other means, namely an endless chain or the like. As illustrated in FIG. 12a, the rack 126 is guided, substantially at a right angle relative to the shaft 134 by a system comprising the aforementioned movable track 128 which is fastened to the elongated horizontal plate 135. The track 128 comprises at least one pair of vertically spaced apart rollers 144 and 145 which are in rolling contact with the upper and lower surfaces, respectively, of the rack 126, and at least two horizontally spaced apart lateral guide bearings 146 which are in rolling contact with the vertical rear surface of the rack 126. The rack 126 thus, serves, to synchronize the rotary motion of the pinion gear 125 on the drive shaft 70 with the rotary motion of the pinion gear 143, and therefore of the pivoting arm 132 which is integral with the gear 143, so that rotation of the drive shaft 70 produces, by means of the actuated electromagnet clutch 116, a corresponding rotation of the pivotal arm 132.

The elongated horizontal plate 135 carries a linear actuatable power cylinder or jack 147 whose cylinder is hinged by means of a vertical pivot pin 148 to a bracket 149 affixed to the horizontal plate 135. The movable piston rod 150 of the jack 147 is linked at its extremity by means of a bifurcated coupling member 151 to the pivotal arm 132 (FIG. 13) via a fulcrum pin 152 to provide for the return of the pivotal arm 132 to its initial relative angular position. The rectilinear movement of the vertical shaft 134 is effected by means of a linear jack or power cylinder 153 (pneumatic or hydraulic) which is affixed to the lower platform 62. The piston rod 154 is connected at its extremity to a bracket 155 which is affixed to the horizontal plate 135, the longitudinal axis of the jack 153 being preferably situated in a plane which passes through the slide 137 and the axis of drive shaft 70.

CONTROLS FOR STRIP PRESENTING UNIT

FIG. 13 illustrates a view of the strip presenting unit 15 desiged to orient the apex strip prior to its application to a bead ring. The unit 15 comprises the aforementioned pivotal arm 132 pivotally supported upon the shaft 134 at one extremity thereof and resting at its other extremity, by means of a socketed ball bearing 156, on a track 157 extending along the lower platform 62. The pivotal arm 132 comprises a bracket 158 onto which there is affixed a guide-like track, for instance of the ball, roller, or slide type, 159, in which there is longitudinally slidably mounted a sliding shoe 160 or the like which slides in a plane encompassing the geometric axis of the vertical shaft 134. The sliding shoe 160 is fastened to the lower side of the aforementioned horizontal sliding console 39.

A linear jack or power cylinder 161 containing a pneumatic or hydraulic fluid under pressure and having a horizontal longitudinal axis situated in the vertical plane of the track 159 when actuated will shift the shoe 160 and console 39. The cylinder of the jack 161 is fastened to the bracket 158, and its piston rod 162 is connected at its extremity to a block 163 integral with the lower side of the console 39. The jack 161 can, therefore, vary selectively the relative position of the console 39 with respect to the pivotal arm 132. There is provided a releasable locking means which can immobilize the console 39 in any predetermined relative position selectively adjustable with respect to the pivotal arm 132. The locking means is preferably consituted by an electromagnet 164 which straddles the console 39 and the bracket 158. The moment the electromagnet is energized, it will render the console 39 electromagnetically integral with the pivotal arm 132.

The console 39 carries, at its end proximate the vertical shaft 134, a cutting guide unit 165. The unit 165 includes a slotted portion 166 which is inclined for receiving and accommodating the knife of the aforementioned cutting unit 65 which as will be described below acts to chamfer the ends of the strip 4. As shown in more detail in FIGS. 13a and 13b, the cutting guide unit 165 is provided with a servo-controlled element comprising, for instance, a horizontal pivotal applicator finger 167 hinged upon a vertical pin 168. The finger 167 is connected to a pneumatic or hydraulic control jack 169 having a cylinder which is pivotally mounted by means of a collar 169a in a yoke 169b integral with the console 39. The piston rod 169c of the jack 169 is hingedly mounted at 169d to the finger 167. The applicator finger 167 is connected in a horizontal cross slot or groove 165a of the unit 165 which permits the passage of the extremity of the finger 167 so that it may cooperate selectively with the base of the apex strip 4 in order to press it against a bead ring.

The unit 165 is provided further with means for selectively restraining the apex strip 4, such means comprising pinching elements 170, 170a having barbs. The pinching elements 170 and 170a are disposed on each side of the inclined slot 166, and are vertically movable by means of the power cylinders or jacks 171 and 172 having piston rods 173 and 174, respectively, into engagement with the apex strip 4 when the knife of the unit 65 is actuated to chamfer the ends of the strip 4. Each jack 171, 172 is fastened onto a support 175 which is integral with the console 39. As shown in FIGS. 13 and 13b, the apex strip 4 is guided in the cutting guide unit 165 by means of a plurality of lower rollers 165e and by a plurality of upper rollers 165f having inclined axes complementing the hypotenuse of the triangular cross-section of the apex strip 4.

STRIP PRESSURE GUIDE UNIT

FIG. 14 illustrates the pressure guide 66, whereas FIGS. 15 through 17 illustrate a device 176 for terminating the laying of the apex strip upon a bead ring and which cooperates with the pressure guide 66. The pressure guide 66 is mounted upon a vertical nonrotatable shaft 177 that is fastened at its lower extremity to a horizontal base plate 178. The plate 178 is integral with a sliding shoe 179 slidingly mounted upon an elongated guide slide 180, for instance of the ball or roller bearing type. The guide slide 180 is fastened onto the upper platform 63. A common vertical plane of the guide slide 180, of the slide shoe 179 and of the vertical shaft 177 passes through the geometric axis of the drive shaft 70 of the pulley 16 in such a way that the shaft 177 and the pressure guide 66 carried thereby can thus be moved radially with respect to the drive shaft 70 and, therefore, radially with respect to the pulley 16.

The shaft 177 passes through the horizontal arm 67 via an elongate opening or slot 181 having a major diametral axis which passes through the central geometric axis of the shaft 68 upon which the arm 67 is pivotably mounted. The vertical shaft 177 preferably carries at least one roller bearing 182 capable of rotating freely on the shaft 177 and which is in rolling contact with the opposite, parallel, recti-linear longitudinal edges of the guide slot 181 provided in the horizontal arm 67. At the upper end of the shaft 177 there is coaxially mounted thereupon a lower strip-supporting member 183 capable of rotating freely around the shaft 177 and movable into and out of close proximity with the pulley 16 upon suitable radial displacement of the shaft 177. Beneath the member 183, the shaft 177 carries a substantially horizontal support frame 184 (FIGS. 15 and 16) held by two spaced vertical rods 185 and 186. The support frame 184 is provided with an apertured portion 187 which surrounds the shaft 177. The apertured portion 187 is divided by a slot 188 (FIG. 16) which extends radially from the shaft 177 to the outer free edge of the support frame 184. The split apertured portion 187 of the frame 184 thus serves as a tightening collar by means of which the frame 184 is prevented from rotating relative to the shaft 177, tightening being achieved by means of a screw 189 threadedly mounted in the frame 184 across the slot 188 to permit squeezing of the apertured portion 187 against the shaft 177.

The rods 185 and 186 are suspended from a substantially horizontal brace or crossbar 190. The crossbar 190 is centrally provided with an orifice 191 in which there is fixedly mounted the cylinder of a vertical jack 192 (pneumatic or hydraulic fluid) by means of a fastening collar 193 which permits adjustment of the relative vertical position of the jack 192. The jack 192 is coaxially mounted above the shaft 177 and is provided with a vertically movable piston rod 194. The rod 194 is provided with a lower recessed end 195 for slidingly receiving the upper end 196 of the shaft 177 when the piston rod is moved downwardly. The upper end 196 of the shaft 177 and the lower recessed and 195 of the piston rod 194 serve cooperatively to center the rod 194 relative to the shaft 177.

On the lower end portion of the piston rod 194 there is coaxially mounted an upper strip-supporting member 197 which rotates or idles freely around the piston rod 194 and which can be lowered or raised selectively by the latter to be moved toward or away from the lower strip-supporting member 183. The opposing or confronting surfaces 198 and 199 of the member 183 and 197, respectively, are generally frusto-conical and complement the triangular cross-section of the apex strip 4. The outer diameter of the upper end portion of the lower member 183 is such that, in its position adjacent the bead ring 69 carried by the pulley 16, the surface 198 of the member 183 will contact with the bead ring 69. The surface 199 of the upper member 197 is provided with an annular step or shouldered portion 200 which is adapted to overlie the bead ring 69 and remain out of contact therewith as the strip 4 is pressed against the bead ring 69. The annular clearance between the members 183 and 197 defined by the confronting surfaces 198 and 199 thus is adapted to closely guide the strip 4 on and against the bead ring 69 to adhere to the latter.

As shown in FIGS. 15 and 16, the unit 176 also comprises a vertically pivotal finger 201 that extends substantially horizontal when at rest at an elevation which is in immediate proximity to and substantially at the level of the upper surface 198 of the lower member 183. The finger 201 is integral with a bent lever 202 that is pivotally supported by means of a pin 203 upon the frame 184. The frame 184 is provided with a slot 204a (FIG. 16) through which the lever 202 is vertically pivotable. The finger 201 is generally tangentially disposed relative to that portion of the apex strip 4 which is upstream (to the right in FIG. 16) of reference point A on the bead ring 69. The reference point A is situated in the median vertical plane of the track 180, of the central axis of the shaft 177 and of the drive shaft 70 of the pulley 16.

In FIG. 16, there is indicated by reference character 4' that portion of the apex strip 4 upstream of the reference point A on the bead ring 69 prior to being wound upon the latter, and by the reference character 4" that portion of the apex strip 4 already wound upon the bead ring. The finger 201 is thus just below and obliquely oriented with respect to the apex strip portion 4' at the periphery of the lower strip-supporting member 183. The lever 202 is also pivotally fastened to, by means of a horizontal pin 204, to a movable piston rod 205 of a jack 206 (pneumatic or hydraulic fluid) whose cylinder is fastened to a support gusset 207 which in turn is fastened to the adjoining rod 186. The gusset 2007 is provided with an opening 208 into which the cylinder of the jack 206 is threaded. The jack 206 when actuated will, via the piston rod 205, effect pivotal movement of the lever 202 into and out of its horizontal at-rest position.

OPERATION OF STRIP PRESSURE GUIDE UNIT

The pressure guide unit 66 is effective to guide, by means of the annular clearance between the two strip supporting members 183 and 197, the apex strip 4 onto and against the bead ring 69 during one complete rotation of the pulley 16 from the reference point A. Because of the pressure exerted by the unit 66 against the strip 4, via the arm 67, the strip 4 will adhere, due to its tacky condition, to the bead ring 69. Pressure is also effected when the jack 192 is actuated so as to cause the upper strip-supporting member 197 to descend slightly relative to the lower strip-supporting member 183, thereby, squeezing the chamfered overlapping leading and trailing ends of the strip 4 therebetween radially outwardly thereof and against the bead ring 69. The finger 201, when pivoted upwardly by means of the jack 206, acts to lift the trailing chamfered end of the strip 4 slightly away from the bead ring 69 so that the leading chamfered end can be moved accurately, upon one revolution of the pulley 16, below the trailing end and superpositioned therebelow. The jack 206 is then protracted to restore the finger 201 to its at-rest horizontal position, whereupon the upper member 197 is shifted downwardly by the jack 192 so as to pressure the superposed chamfered strip ends against one another.

It will be understood that the jack 153, when actuated, will shift the shaft 134 (FIG. 12) which in turn effects pivoting of the arm 67. When the latter arm is pivoted, the shaft 177 upon which the pressure guide unit 66 is carried is likewise shifted such that the lower strip-supporting member 183 is moved into engagement with the bead ring 69. Upon the latter said engagement, the pivotal arm 67 is locked in position by means of a releasable locking device preferably including an electromagnet 209 affixed onto the upper platform 63 (FIGS. 8, 8a, 9, 9a, and 20) and positioned beneath an extension leg 210 of the arm 67. Thus, the electromagnet 209 will retain the lower strip-supporting member in engagement with the pulley 16 so as to rotate with the latter and transfer to the bead ring 69 the strip 4. During this period, the jack 153 can be deactuated.

Figure 19:
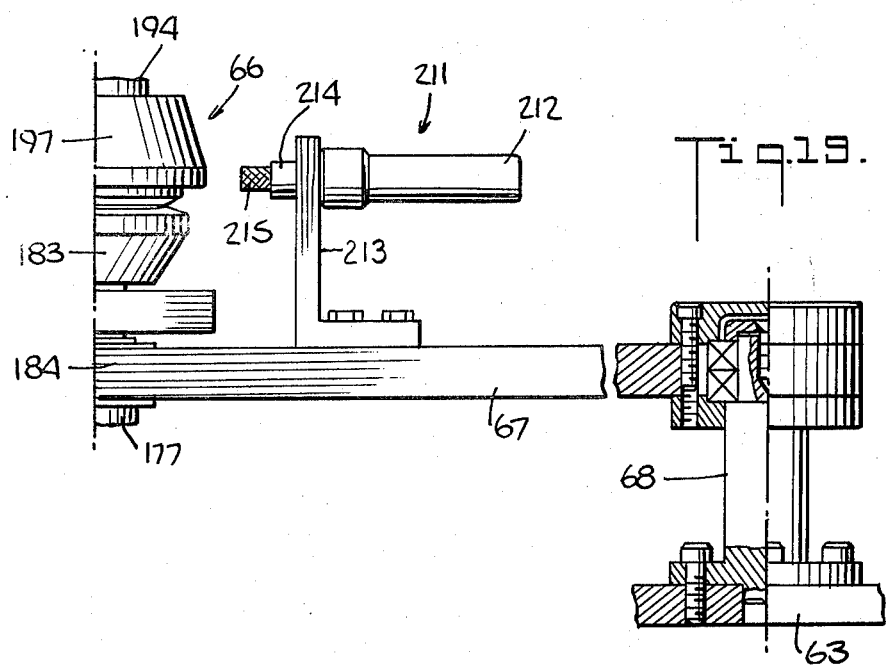
FIG. 19 is a fragmentary, partially cross-sectional view of one of the pivotal arms, as viewed in the direction of the arrow XIX in FIG. 9a, illustrating the pivot spindle thereof, a portion of the aforementioned pressure guide, and a pressure guide brake mounted on the latter pivotal arm.

Associated with the unit 66 is a braking device 211 (FIG. 19) which is designed to stop the rotation of the upper strip-supporting member 197 with respect to that of the lower member 183. This will prevent the ends of apex strip 4, when carried by the members 197 and 183, from deforming and straddling the bead ring 69. The braking device 211 includes a linear jack 212 (hydraulic or pneumatic) and has a substantially horizontal longitudinal axis that extends normally of the axis of rotation of the members 183 and 197. The cylinder of the jack 212 is affixed to a support bracket 213 which is in turn fastened to the horizontal arm 67. The piston rod 214 of the jack 212 carries at its free extremity a friction-inducing lining constituted for instance of a felt washer or resilient bumper 215 which is capable of bearing, under the thrust of the jack 212, against the periphery of the upper member 197 of the pressure guide unit 66. It will be understood that the jack 212 can either be a double action type for effecting retraction of the piston rod 214 thereof, or alternatively a spring or the like can be provided to retract the piston rod 214.

An alternate embodiment 66' of the pressure guide unit 66 is illustrated in FIG. 18, wherein there is obviated the need for the braking device 211. In the alternate embodiment, the rods 185 and 186 are upwardly extended further, and the cross-bar 190, carrying the jack 192, is in this instance integral with an upper yoke shaped frame 216 constituting a kind of lifting means substantially in the shape of a rectangular frame slidingly mounted vertically on the guide rods 185, 186. The upper horizontal end of the yoke 216 is fastened to the extremity of a movable vertical piston rod 217 of a hoisting jack 218 (pneumatic or hydraulic) having a vertical oriented cylinder which is fastened to the horizontal upper crossbar 219. The jack 218 is substantially coaxial with the jack 192 associated with the upper and lower strip-supporting members 197 and 183, respectively. Because of the provision of the jack 218 and the yoke 216, the jack 192 and the upper strip-supporting member 197 can be elevated and separated slightly from the lower strip-supporting member 183 when the chamfered ends of the apex strip 4 are to be superposed upon one another and upon the bead ring 69. This action will prevent the chamfered ends of the apex strip 4 from being crushed by the members 183 and 197 at the critical time when they are being superposed upon one another.

STRIP-END CHAMFERING UNIT

Figure 20:
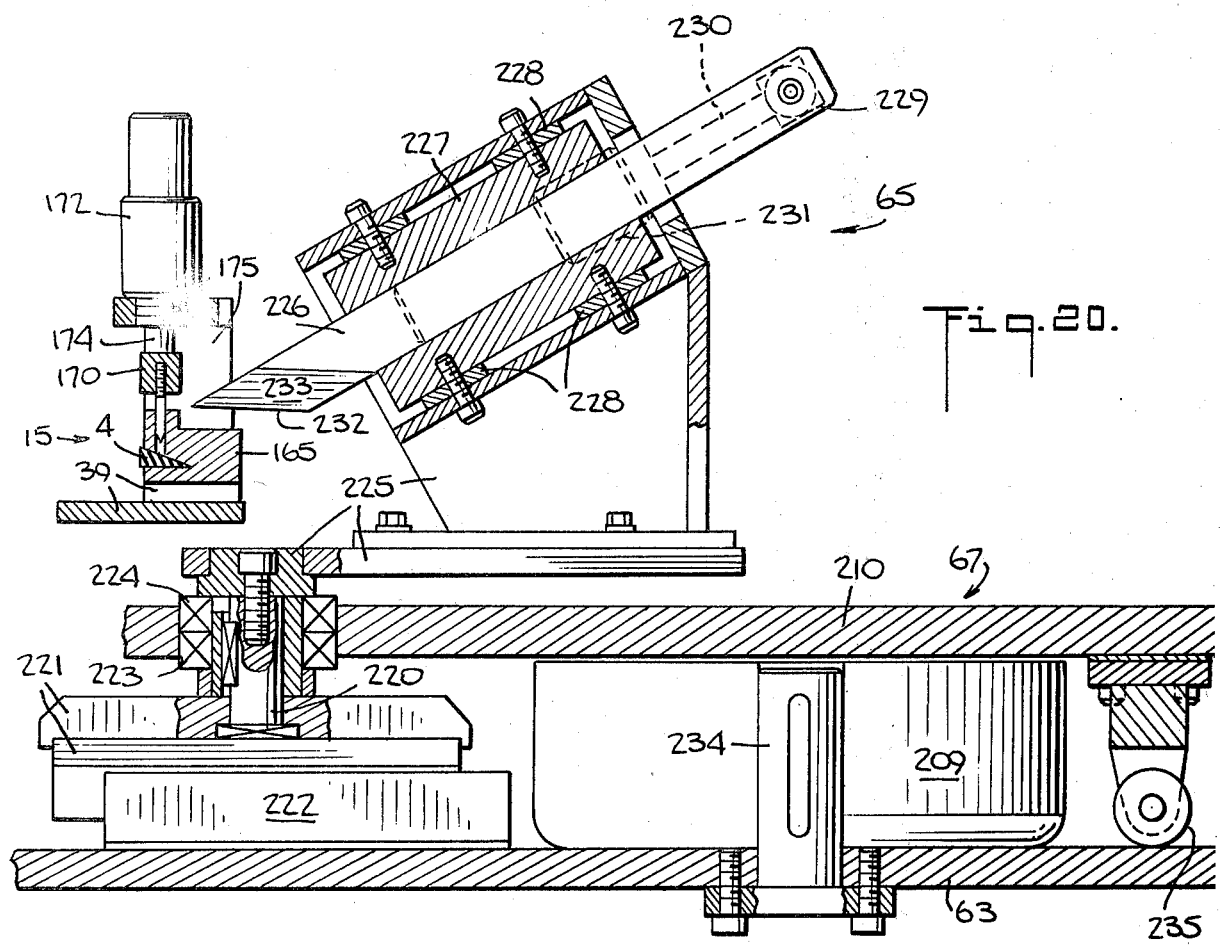
FIG. 20 is an enlarged, cross-sectional, fragmentary view, taken along the broken line XX—XX in FIG. 9a, illustrating the apex strip chamfer edge cutting device.

The apex strip cutting unit 65 is illustrated in FIG. 20. The unit 65 is disposed between the strip presenting unit 15 and the pressure guide unit 66. The cutting unit 65 is supported upon a vertical carrier shaft 220 which is rigidly fastened upon a sliding shoe 221. The shoe 221 is mounted slidingly in a stationary track 222, for instance of the ball or roller bearing type. The track 222 is fastened to the upper platform 63 and lies in a median or central vertical plane which passes through the axes of the drive shaft 70 and the carrier shaft 220. The carrier shaft 220 projects axially through an opening 223 in the extension leg 210 of the horizontal arm 67. The opening 223 is in the form of a rectilinear slot having parallel opposite longitudinal edges which extend in a direction of a vertical plane which passes centrally through the slot 223 and through the central axis of the pivot shaft 68 of the horizontal arm 67. The vertical shaft 220 is provided with a roller bearing unit 224 which engages and lies in the slot 223.

At the upper end of the carrier shaft 220 and above the horizontal arm 67 there is rigidly mounted a frame 225 which carries the cutting unit 65. The cutting unit 65 comprises a knife 226 which is endwise slidingly mounted inside of a heating block 227 fastened to the frame 225. The heating block 227 is preferably thermally insulated from the frame 225 by means of washers or small plates 228 made of heat-insulatory material. The heating block 227 includes, for instance, an electric resistor which is heated the moment an electric current of appropriate intensity passes therethrough. The rear end of the knife 226 is connected, by means of a crossbar 229 that extends perpendicularly of the knife 226, to the end of the movable piston rod 230 of a reversible or double-action power cylinder or jack 231. The cylinder of the jack 231 is fastened to the frame 225. The central axis of the piston rod 230 is substantially parallel to the longitudinal axis of the knife 226 so as to shift the latter toward and easy from the bead ring-carrying pulley 16.

The front end of the knife 226 is beveled at 233 and provided with a tapered cutting edge 232 that is inclined with respect to the general longitudinal axis of the knife 226 and is designed, upon the advance of the knife 226, to enter the slot 166 of the cutting guide unit 165 and chamfer the apex strip 4. The knife itself lies in a plane which is inclined relative to the apex strip 4 and which conforms to the angle of inclination of the slot 166 (FIG. 13). In order to maximize the effective cutting surface of the knife 226 and chamfer the leading and trailing ends of the apex strip 4 over a substantial extent, the longitudinal axis of the knife 226 defines, in a three-dimensional reference coordinate system (not shown), an angle of approximately 15° when projected on one vertical reference plane, and an angle of 30° when projected on the horizontal reference plane. The cutting edge 232 is substantially larger than the width of the apex strip 4 and always remains horizontal so that the apex strip 4 is chamfered with a cut that is straight and oriented radially of the pulley 16 and bead ring 69.

It will be understood, that the end portion of the leg projection 210 of the arm 67 is slidably mounted upon a track member 234 which is affixed to the upper platform 63. Moreover, the free end of the leg projection 210 is provided with a roller 235 which rests upon the upper platform 63. Thus, as the arm 67 pivots about its shaft 68, the leg projection 210 slides relative to the upper platform 63 and causes the cuttiing unit 65 to align itself with the strip presenting unit 15 via the elongate slot 223 provided in the leg projection 210. The jack 231 can then be actuated to shift the knife 226 through the apex strip 4 to chamfer the latter.

SIZING MEANS FOR BEAD RING-CARRYING PULLEY

Referring now to FIGS. 21 through 25, the pulley 15 comprises a substantially horizontal base plate 236 which is affixed to the upper extremity of the drive shaft 70 for rotation with the latter. Affixed to the plate 236 are a plurality of radially oriented dove-tailed tracks 237. Preferably twelve such tracks are provided. Slidingly mounted upon the tracks 237 are respective shoes 238, each of which carries a segment 239. The segments 239 define cooperatively with one another an expansible, collapsible, bead ring support means. The segments 239 are likewise, preferably, twelve in number, each having an effective bead ring-engaging outer arcuate edge of approximately 30° when contracted fully. As illustrated in FIG. 21, the overhanging free end of each segment 239 rests upon at least one roller bearing 240 having a horizontal pin 241 which is mounted in a yoke 242 attached to the free end of the track 237. Each pin 241 extends substantially perpendicular to the median longitudinal vertical plane of its associated track 237, which plane passes through the axis of rotation of the shaft 70.

The base plate 236 carries twelve equidistantly spaced, vertical, guide rods 243 which are, for instance, threaded thereinto at their respective lower ends. Each of the rods 243 is situated in the aforementioned median longitudinal vertical plane of its associated track 237. The rods 243, which are thus uniformly concentrically distributed around the shaft 70, carry at their respective upper ends a fixed horizontal circular plate or disc 244 which braces the rods 243 to one another. On each vertical rod 243 there is slidingly mounted a sleeve 245. Each sleeve 245 is affixed to a common, movable, circular plate 246 which constitutes a lifting means therefor fastened to the upper end of the piston rod 111 of the jack 112. Each shoe 238 is connected to an associated one of the sleeves 245 via a connecting rod 247. The rods 247 each are linked at one end by means of a respective pin 248 to a respective one of the shoes 238, and at the opposite end by means of a pin 249 to a respective one of the sleeves 245. The length of each rod 247 between the axes of articulation thereof defines the maximum stroke of the segment 239 associated therewith, the segments 239 being illustrated in FIGS. 21 and 24 in a condition of maximum retraction, and in FIGS. 22 and 25 in a condition of maximum protraction.

The upper brace plate 244 is actually supported by twelve posts 250 that are angularly equidistant from one another and uniformly distributed around the shaft 70. The posts 250 are each threadedly fastened, at their lower ends, to the base plate 236. Each vertical post 250 comprises, at its upper end, a collar 251 on which there rests the plate 244, the latter being held in position on the posts 250 by means of nuts 252 that are threaded upon the upper end of the posts 250 above the plate 244. Each vertical rod 243 passes freely through the upper plate 244 and is fixed thereto by means of nuts 253. In this manner, the rods 243, relative to which the sleeves 245 are slidable for effecting expansion or collapsing of the pulley 16 via the segments 239, are braced in a vertical array. FIGS. 24 and 25 show in particular that the free arcuate edge of each segment 239 has a radius of curvature, in a horizontal plane, which is at least equal to and, preferably, slightly less than the internal radius of a bead ring 69 that has to be mounted upon the pulley 16. Thus, the effective diameter of the pulley 16, via the shiftability of the segments 239, can be altered so as to accommodate bead rings of various diameters. The piston rod 111 of the jack 112 when protracted will effect an uplift of the sleeves 245, a retraction of the sleeves 239 and a contraction of the diameter of the pulley 16. On the other hand, when the piston rod 111 is retracted, the sleeves 245 will move downwardly and collectively cause a protraction of the segments 239 and, thereby, an increase in the diameter of the pulley 16.

BEAD RING PRESENTING UNIT

Figure 27:
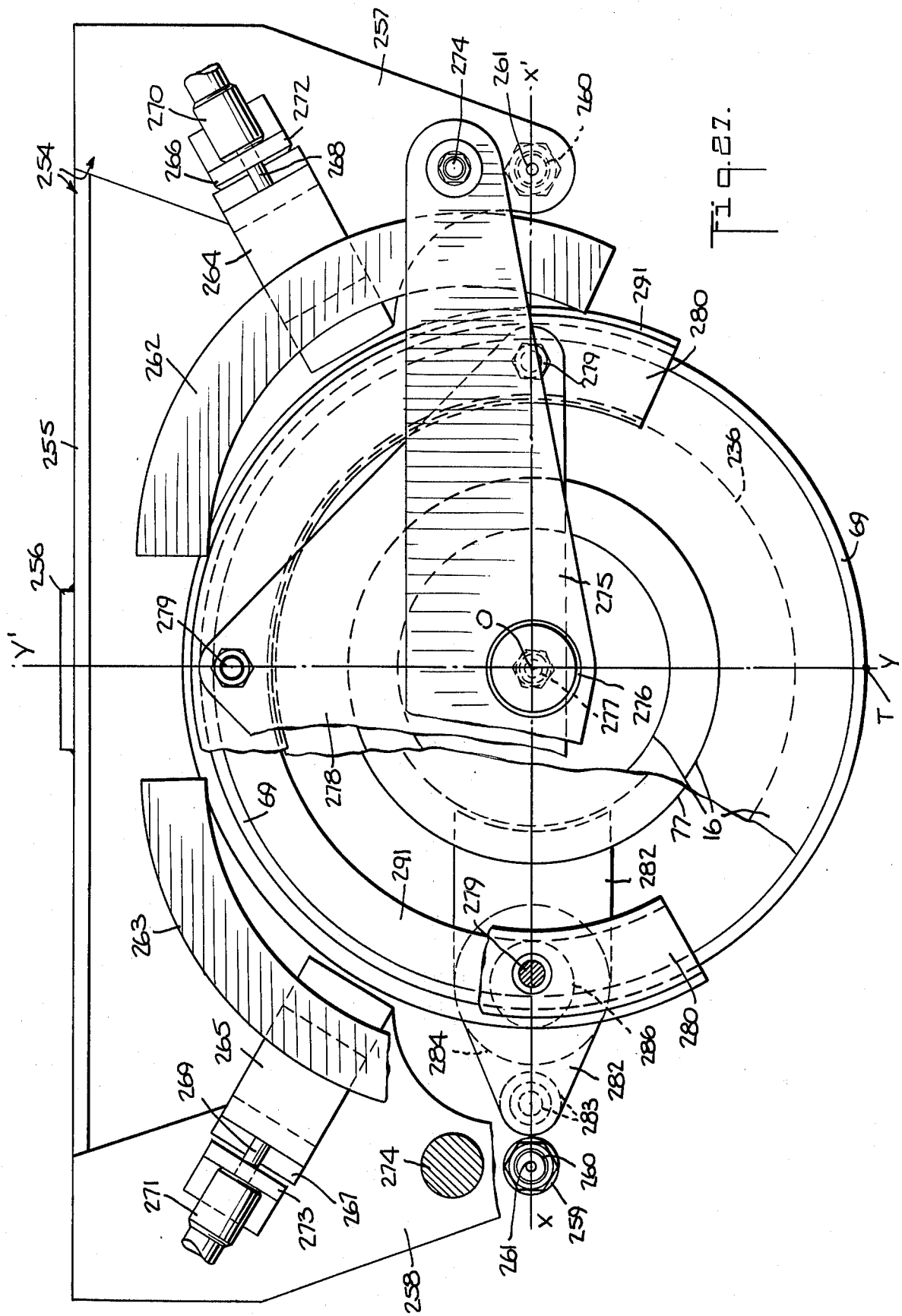
FIG. 27 is a fragmentary, top view of the device illustrated in FIG. 26.

Illustrated in FIGS. 26 and 27, is a semi-automatic device for placing a bead ring 69 upon the pulley 16 and for removing from the pulley 16 the bead ring 69 after it is covered with an apex strip. The pulley 16 is shown merely schematically in the latter FIGS. The bead ring presenting device or assembly is substantially symmetrical with respect to a median vertical plane (line Y O Y' in FIG. 27) passing through the center O of the pulley 16 (and therefore through the axis of rotation of the shaft 70) and perpendicular to the direction XX' of the common horizontal central longitudinal axis of the jacks 90 to 93. The device comprises a supporting frame 254 in the form of a substantially horizontal beam which is spaced proximate to the pulley 16 and is parallel to the common longitudinal axis of the jacks 90 to 93. This horizontal longitudinal beam is fastened upon a central vertical upright 256 which in turn is fastened on and projects upwardly from the lower platform 62 of the machine. The beam 255 carries respectively at its opposite extremities, respectively, two substantially symmetrical horizontal plates 257, 258 which in spaced relation relative to the pulley 16 embrace the periphery of the latter. Each plate 257, 258 rests on and is affixed to a vertical post 259 extending upwardly from and fastened to the upper platform 63 of the machine. Each post 259 is in the form of a power cylinder or jack (pneumatic or hydraulic) and is provided with a piston rod 260 to which the plates 257 and 258 are affixed via respective bolts 261 or the like. The piston rods 260 serve as means for adjusting the height of the plates 257 and 258 relative to the pulley 16.

The plates 257 and 258 support an assembly of expansible, contractable, nature which is adapted to position or remove, selectively, a bead ring upon the pulley 16. The latter assembly includes a pair of arcuate plate members 262, 263 that are symmetrically arranged on each side of the pulley 16 and disposed at a higher level than the radially movable segments 237. Each plate 262, 263 is preferably curved in the shape of a circular segment having a concavity which confronts the pulley 16 (FIG. 27). Each plate 262, 263 is radially movable with respect to the axis of rotation of the pulley 16 and, to this end, each plate 262, 263 is carried by a slide shoe or the like 264, 265, respectively. The shoes 264 and 265 are slidingly mounted on respective tracks 266 and 267 which in turn are fastened to the plates 257 and 258, respectively. The median vertical plane of each track 266 and 267 passes through the axis of rotation 0 of the pulley 16. Each of the slide shoes 264 and 265 is affixed to the respective ends of a pair of horizontal piston rod 268 and 269 which are actuated by power cylinders or jacks 270 and 271, respectively (pneumatic or hydraulic). The cylinders of the jacks 270 and 271 are fastened on respective brackets 272 and 273 which in turn are affixed to the plates 257 and 258, respectively.

The two plates 262 and 263 are designed to jointly receive and support, temporarily, above and radially beyond the segments 239 of the pulley 16, a bead ring 69. The bead ring 69 is manually positioned upon the plates 262 and 263 after the latter are protracted or retracted sufficiently to accommodate the particular diameter of the bead ring 69. The jacks 270 and 271 are, thus, double-action or reversible jacks which when retracted release the bead ring 69 so that it may be applied to the pulley 16.

A pair of uprights 274 (shown in reduced length in the drawings) are, respectively, attached to the horizontal plates 257 and 258 of the support frame 254, and are braced by a horizontal crossbar 275 passing above the center of the pulley 116. A vertical, reversible or double-action, jack 276 (pneumatic or hydraulic) is fastened to the crossbar 275 in substantially coaxial relation with the pulley 16. A vertically movable piston rod 277 of the jack 276 carries at its lower extremity a lifting beam 278 in the form of a substantially triangular plate extending above the pulley 16. The beam 278 supports beneath the pulley 16, at its three apexes, by means of three vertical rods 279, a substantially horizontal magnet-carrying, partially circular plate 280 in the form of an incomplete ring. The plate 280 extends coaxially above the pulley 16 and surrounds a major portion of the latter. The plate 280 carries on its lower face, which confronts the pulley 16, a plurality of magnets 281 that are circumferentially distributed thereon and designed to magnetically grip the bead ring 69 after the latter is placed on the plates 262, 263. The vertical stroke of the piston rod 277 of the jack 276 is adequate to allow the magnet-carrying plate 280 to be lowered from its highest extreme position to its lowest extreme position in which the lower face of the magnets 281 is substantially in the plane of the upper surface of the movable segments 239 of the pulley 16. In this position, the bead ring 69 is ready for being transferred to the segments 237.

There is furthermore provided a retractable unit for transferring the bead ring from the plate 280 to the pulley 16, and for, thereafter, ejecting the apex strip covered bead ring from the pulley 16. This unit is carried by a substantially horizontal support plate 282 positioned beneath the pulley 16 and supported by vertical columns 283 which are in turn fastened to the upper platform 63. The center of the plate 282 is bolted to the housing 77 (FIG. 27). A plurality of vertical cylindrical housings 284 are fastened to and beneath the horizontal support 282, and are distributed around the pulley shaft 70. There are, preferably, provided at least two of such vertical housings 284 which are arranged, for instance, diametrically opposite one another on each side of the shaft 70. Each vertical housing 284 contains a pair of series connected, coaxially aligned, power cylinders or jacks 285 and 286 (pneumatic or hydraulic).

Each cylinder of lower jacks 285 is affixed to the bottom of its associated cylindrical housing 284, whereas their respective vertically movable piston rods 287 support, respectively, the upper jacks 286 through the intermediary of respective coupling sleeves 288 or the like. The sleeves 288 intercouple the piston rods 287 and 289 of the lower and upper jacks 285 and 286, respectively. The cylinders of the upper jacks 286 project freely through respective apertures 290 formed in the upper end of the housings 284 and support, cooperatively, a partially circular ejection plate 291 which is in the form of an incomplete ring and coaxial with the pulley 16. The inner diameter of the plate 291 is slightly greater than the minimum diameter of the pulley 16 when the segments 239 of the latter are fully retracted, whereas the outer diameter thereof is greater than the maximum diameter of the pulley 16 when the segments 239 thereof are fully protracted.

The ejection plate can be elevated from an inactive position beneath the level of the segments 239 to an intermediate position wherein it is substantially level with the lower face of the segments 239, and therefrom to a final position above the level of the segments 239 for ejecting from the latter the apex strip-covered bead ring 69. To this end, the upper jacks 286 serve as means for raising the plate 291 from the inactive position to the intermediate position. The lower jacks 285 thereafter serve as means for raising the plate 291 from the intermediate position to the final position for ejecting the bead ring 69 from the segments 239. The upper jacks 286 are adapted to be actuated in unison, independently of and earlier than the actuation of the lower jacks 285.

OPERATION OF OVERALL MACHINE

Referring again to FIGS. 8, 8a, 9 and 9a of the drawings, the letters YOY' designate a vertical plane passing through the center 0 or axis of rotation of the pulley 16. The plane YOY' is perpendicular to a vertical plane passing through the center of the pulley 16 which is designated by the line XOX' and which is parallel to the common longitudinal axis XX' of the indexing jacks 90 to 93. The line OZ designates a vertical plane passing through the axis of rotation 0 of the pulley 16 and through the central axis K of the vertical shaft 134 which shifts the pivotal arm 67. The plane OZ, therefore, coincides with the vertical plane which encompasses the track 137 and the piston rod 154 of the jack 153 (FIG. 12). Finally, the line OM designates the vertical plane which passes through the track 180 (FIG. 14), through the axis P of the shaft 177 of the pressure guide unit 66 which is shiftable along the track 180, and through the axis of rotation 0 of the pulley 16. The line OM forms, for instance, in one angular direction, an angle of about 45° with the line OY, and, in the opposite angular direction, an angle of 45° with the line OX'. The line OZ bisects the 45° angle between the lines OM and OY and, thus, forms an angle of 22.5° with each of the latter.

The edge of the apex strip 45 which is to be applied to the bead ring 69 is disposed upon the sliding console 39 of the strip-presenting unit 15 such that it passes substantially through the point K or the vertical axis of the shaft 134 when the latter is in a condition wherein the lower strip-supporting member 183 which idles upon the shaft 177 is in engagement with the bead ring 69 (FIG. 14). The latter condition of the shaft 134 is illustrated in FIGS. 8 and 8a, and represents the initial condition for applying the leading end of the strip 4 to the bead ring 69.

In this condition, the tangential contact point T of the leading end of the apex strip 4 is preferably situated at the line YOY'. The point T corresponds to the tangential contact point T' of an earlier disposed bead ring 69 with the trailing end of an earlier applied apex strip thereto, following one complete strip-applying revolution of the pulley 16 counterclockwise. Accordingly, in FIGS. 8 and 8a, the linear extent of the apex strip 4, as it is initially advanced by the presenting unit 15 to the bead ring 69, is substantially parallel to the common longitudinal axis XX' of the jacks 90 through 93 of the indexing unit 64. For further reference purposes hereinafter, the reference character A on line OM designates the tangential contact point of the lower strip-supporting member 183 of the pressure guide unit 66 with the bead ring 69. On the other hand, the reference character B on the line XOX' designates a one-quarter counterclockwise revolution of the pulley 16.

It will be understood, that the position of the console 39, as carried by the pivotal arm 132, relative to the pulley 16 is substantially different in each case wherein the bead ring is changed for one of a different diameter. The application of the apex strip 4 to the bead ring 69 is always initially carried out such that the strip 4 extends parallel to the line XOX' at the point T, the relative position of the point T being variable along the line YOY' according to the dimensions of the bead ring used. The distance TK between the points T and K, which represents the radius of an arc described by the point T upon rotation of the strip-presenting unit 15 around the central point K of the pivot shaft 134, is therefore variable. It is dependent upon the dimension of the bead ring used since the relative position of the console 39 varies with respect to the point K.

The machine pursuant to the present invention may be associated with a conventional, programmable, sequential control system (not shown) for effecting the various operations timely. The general control system is preferably of the electropneumatic type which includes various actuating servo-mechanisms in the form of pneumatic jacks supplied with compressed air, and in the form of the double-action or reversible type associated with a return spring. The electric and pneumatic circuits are conventional and, thus, have not been illustrated.

With the pneumatic and electric circuits of the machine properly pressurized and energized, the apex strip supply system shown in FIG. 1 is actuated to peel the apex strip 4 from the reel 1, via the drive rollers 5 and 9, and advance the strip 4 to the oscillating pulley 17 and the slidable roller unit 18. When the leading end of the strip 4 reaches the cutting guide unit 165, the jack 171 is actuated to lower the pinching or barbed element 170 into engagement with the strip 4 to restrain the latter (FIG. 13). Advancement of the strip 4 upstream of the unit 165 is at this time terminated.

The plates 262 and 263 (FIG. 27) are then together moved toward the pulley 16, via their respective jacks 270 and 271, and a bead ring 69 is manually positioned thereupon. The magnet-carrying plate 280 then descends downwardly upon the plates 262 and 263, by means of the jack 276, so as to grip the bead ring 69 and remove the latter from the plates 262 and 263 via the magnets 281. The magnet-carrying plate 280 is then raised, and the plates 262, 263 are simultaneously retracted radially beyond the dimensions of the plate 280. The ejection plate 291 is then elevated via the upper jacks 286 to the level of the segments 239 of the pulley 16. The magnet-carrying plate 280 is then lowered again to the level of the segments 239, wherein the bead ring 69 engages the ejection plate 291. The segments 239 are then protracted and radially grip the bead ring 69. The magnet-carrying plate 280 is, thereafter, elevated, and the ejection plate 291 descends leaving the bead ring 69 upon the pulley 16.

The shaft 134 of the strip presenting unit 15 is then moved toward the pulley 16 via the jack 153 (FIG. 12). This action causes, concomitantly, a turning of the horizontal arm 67 about the shaft 68. As the arm 67 turns, it moves the carrier shaft 220 (FIG. 20) of the cutting unit 65, and the carrier shaft 177 (FIG. 14) of the pressure guide unit 66, toward the pulley 16 until the lower strip-supporting member 183 engages the bead ring 69. During this period, the strip presenting unit 15 is adjusted in a direction parallel to the line XOX' such that the leading end of the strip 4, restrained by the pinching element 170, is tangent to the bead ring 69 at the point T. It is presumed for the purposes of description herein, that the leading end of the apex strip 4 has already been chamfered and thereby separated from the trailing end of a leading apex strip which has already been applied to an earlier disposed bead ring. Such operation will be described below.

It is the jack 161 (FIG. 13) which is actuated to adjust the position of the console 39 relative to the bracket 158 of the strip presenting unit 15 so as to properly position the leading (already chamfered) end of the apex strip 4 at the tangential reference point T on the bead ring 69. In this manner, the distance TK is defined. Once so defined, the electromagnets 164 (FIG. 13) and 209 (FIG. 8), respectively, lock the console 39 and the horizontal pivotal arm 67 in their newly adjusted relative positions. At this time, the chambers of the jack 153 are exhausted. The pivotal finger 167 (FIG. 13a) is then turned, via the jack 169 on the cutting guide unit 165, into engagement with the leading end of the strip 4 so as to press the latter against the bead ring 69. The strip 4, thereby, initially adheres to the bead ring 69.

The pinching element 170 is then raised and released from the strip 4, via the jack 171, and the pulley 16 is rotated, via the first indexing jack 90, counterclockwise over an arc TA. The leading end of the strip 4 is, thereby, positioned opposite the pressure guide unit 66. The electromagnetic clutch 116 (FIG. 10) is then engaged to couple the pinion gear 125 to the shaft 70 of the pulley 16. The pulley 16 is then turned, via the second indexing jack 91, over an arc AB such that the leading end of the apex strip 4 lies on the diametral line XOX' of the pulley 16. Since the electromagnetic clutch 116 has been energized, during the latter rotation of the pulle 16, the rack 126 is shifted and, thereby, turns the pivotal arm 132 (FIGS. 12 and 13) about the shaft 134. As the arm 132 turns, the strip presenting unit 15, thereby, turns from the position thereof illustrated in FIG. 8 to the position illustrated in FIG. 9. The electromagnetic clutch is then deenergized, and the pulley 16 is again rotated, via the third indexing jack 92, over an arc BT' such that the leading end of the apex strip 4 is again precisely at the initial point T wherein it was first applied to the bead ring 69. Thus, the pulley 16 has been rotated, via the first three indexing jacks 90–92, one full revolution.

The pinching elements 170 and 170a adjoining the cutting guide unit 165 are then lowered by means of the jacks 171 and 172 so as to engage the strip 4 upstream of the portion thereof that has already been applied to the bead ring. The chamfering knife 226 (FIG. 20) of the cutting unit 65 is then protracted, via the jack 231, towards the apex strip 4, so as to provide a chamfered trailing end on that portion of the strip 4 already upon the bead ring 69, and concomitantly a chamfered leading end on that portion of the apex strip 4 to be applied subsequently to a further bead ring. The pinching element 170a is then raised, via the jack 172, so as to release the chamfered trailing end of the strip 4. The finger 201 (FIG. 15) is then raised via the jack 206, into engagement with the trailing end of the strip 4 so as to separate slightly the trailing end from the bead ring 69.

Then, the brake unit 211 (FIG. 19) engages the upper strip-supporting member 197 of the pressure guide unit 66 so as to prevent rotation of the member 197. Alternatively, if the embodiment of FIG. 18 is used, rather than that of FIG. 19, the roller 197 may then be elevated, via the jack 218, away from the lower strip-supporting member 183. In either instance, the pulley 16 is then rotated, via the fourth indexing jack 93, over an arc T′A (45°) whereupon the chamfered leading end of the strip 4 is moved below, to be superposed with, the complementary chamfered trailing end of the strip 4 held away therefrom by the finger 201. The finger 201 is then lowered to release the trailing end of the apex strip 4.

The upper strip-supporting member 197 is then released by the brake unit 211, or lowered by the jack 212 (depending which embodiment is used). Thereafter, the upper member 197 is pressed downwardly toward the lower strip supporting member 183, via the jack 192, so as to squeeze the superpositioned leading and trailing ends of the strip 4 therebetween, and, thereby, against one another and against the bead ring 69. The bead ring 69 is, thereby, finally covered by the apex strip 4. The electromagnets 164 and 209 are then deactivated or deenergized so as to release the horizontal arm 67 and the console 39. The shaft 134 is then removed from the vicinity of the pulley 16, via the jack 153 (which is reversible). This results in a corresponding movement, away from the pulley 16, of the cutting unit 65 and the pressure guide unit 66 as the arm 67 pivots in response to shifting of the shaft 134. The return jack 147 (FIG. 12) can also at this time turn the arm 132 associated with the strip presenting unit 15 to the orientation thereof as it existed prior to its being turned by the rack 126, via engagement of the electromagnetic clutch 116, i.e. parallel to the line XX′ of the indexing jacks 90–93.

By means of the upper jacks 286 (FIG. 26), the ejecting plate 291 is raised until the latter engages the bead ring 69. The segments 239 of the pulley 16 are then retracted, so as to release the bead ring 69, via the vertical jack 112 (FIG. 10). The lower jacks 285 are then actuated so as to elevate (and, thereby, eject) the bead ring 69 above the pulley 16. The apex strip-covered bead ring can then be manually removed from the ejection plate 291 for storage, etc., and the latter can then be retracted, via the jacks 285 and 286, to its initial inactive position. Finally, the pulley 16 is rotated in an opposite direction, i.e. clockwise, by the four indexing jacks 90–93 so as to be restored to its initial operative position. The machine is, thus, ready for recycling.

It will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. In apparatus for applying a tacky elastomeric strip to an outer periphery of a bead ring for a pneumatic tire, said apparatus including:
    a. carrier means for detachably supporting a bead ring such that the outer periphery of said bead ring remains exposed;
    b. strip-feed means for advancing an elastomeric strip lengthwise to said bead ring;
    c. strip-application means for applying and effecting adhesion of a leading end of said strip to the outer periphery of said bead ring;
    d. drive means for rotating said carrier means and, thereby, said bead ring and said leading end of said strip relative to said strip-application means;
    e. strip-cutting means for severing a portion of said strip trailing said leading end from the remainder of said strip at a length corresponding to the circumference of the outer periphery of said bead ring; and
    f. strip-pressing means for pressing and effecting adhesion of the severed portion of said strip against the outer periphery of said bead ring during rotation of the latter,
    said drive means including an improvement comprising indexing means for rotating said carrier means intermittently in the course of a single revolution, whereby rotation of said carrier means is halted at selected intervals for operative association with said strip-pressing means and said strip-cutting means,
    said indexing means including a plurality of series-connected, independently actuable, power cylinders corresponding in number to the number of times rotation of said carrier means is halted in the course of at least one revolution for permitting severing and applying said strip to said bead ring, each of said cylinders having a stroke corresponding to the respective angular displacement of said carrier means it is to effect.

2. Apparatus as claimed in claim 1, wherein said power cylinders have a combined stroke sufficient to rotate said carrier means beyond a single revolution, said strip-cutting means including an inclined blade for complementingly chamfering the leading and trailing ends of said strip to, thereby, sever said portion of said strip from the remainder thereof at a length corresponding to but slightly greater than the circumference of said outer periphery of said bead ring, said chamfered ends being adapted to be overlapped with, superpositioned upon and pressed against one another by said strip-pressing means when said carrier means is rotated beyond the extent of a single revolution.

3. Apparatus as claimed in claim 1, wherein said drive means further includes a toothed rack with is endwise shiftable by said power cylinders, said carrier means including means for gripping the inner periphery of said bead ring, a rotary shaft which mounts the latter said means, and a pinion gear concentrically affixed upon said shaft and meshing with said toothed rack.

4. In apparatus for applying a tacky elastomeric strip to an outer periphery of a bead ring for a pneumatic tire, said apparatus including:
    a. carrier means for detachably supporting a bead ring such that the outer periphery of said bead ring remains exposed;
    b. strip-feed means for advancing an elastomeric strip lengthwise to said bead ring;
    c. strip-application means for applying and effecting adhesion of a leading end of said strip to the outer periphery of said bead ring;
    d. drive means for rotating said carrier means and, thereby, said bead ring and said leading end of said strip relative to said strip-application means;

e. strip-cutting means for severing a portion of said strip trailing said leading end from the remainder of said strip at a length corresponding to the circumference of the outer periphery of said bead ring; and f. strip-pressing means for pressing and effecting adhesion of the severed portion of said strip against the outer periphery of said bead ring during rotation of the latter, said strip-pressing means including an improvement comprising a pair of coaxially aligned idler rollers having respective confronting spaced surfaces which in contour together complement the cross-section of said strip, said surfaces defining an annular clearance for constraining said strip in exposed relation relative to said bead ring, shaft means for coaxially supporting said rollers, and means for shifting said shaft means toward and away from said carrier means, said shaft means supporting said rollers such that when shifted adjacent to said carrier means said strip in said clearance between said rollers is tangentially aligned with said bead ring, said shaft means including means for moving at least one of said rollers axially toward the other to decrease the axial extent of said clearance and, thereby, squeeze said severed portion of said strip radially against said bead ring to effect adhesion of said strip portion to said bead ring.

5. Apparatus as claimed in claim 4, wherein said shaft means includes a stationary portion, an enwise shiftable portion coaxially aligned with said stationary portion, and a power cylinder having a piston rod which carries said endwise shiftable portion, one of said rollers being freely journaled upon said stationary portion, the other of said rollers being journaled upon said shiftable portion, said piston rod being actuable for displacement toward and away from said stationary portion to slightly decrease and increase, respectively, said annular clearance between said rollers, selectively.

6. Apparatus as claimed in claim 5, including braking means operatively associated with that roller on said shiftable portion for selectively preventing the latter said roller from idling and rotating during application of the trailing end of said severed portion of said strip to said bead ring.

7. Apparatus as claimed in claim 6, wherein said braking means includes a power cylinder having a piston rod terminating in a friction-inducing end portion which is engageable with the latter said roller.

8. Apparatus as claimed in claim 5, including a further power cylinder having a piston rod, and coupling means interposed between said power cylinder associated with said shiftable portion and said piston rod of said further power cylinder, said piston rod of said further power cylinder when retracted, thereby, effecting substantial separation of said rollers from one another during application of the trailing end of said severed portion of said strip to said bead ring.

9. Apparatus as claimed in claim 5, wherein said strip-cutting means includes an inclined blade for complementingly chamfering the leading and trailing ends of, and thereby severing, said portion of said strip from the remainder of said strip at a length corresponding to but slightly greater than the circumference of said outer periphery of said bead ring, said strip-pressing means further including lift means for lifting the chamfered trailing end of said strip off said bead ring when the latter has been rotated a full revolution to permit the chamfered leading end of said strip to further be rotated into superposition below said chamfered trailing end, said power cylinder being actuable to protract said piston rod thereof to displace the roller associated therewith toward said roller associated with said stationary portion of said shaft means to reduce said annular clearance between said rollers and, thereby, squeeze and effect adhesion of said superpositioned chamfered ends of said severed portion of said strip against one another and said bead ring.

10. Apparatus as claimed in claim 9, wherein said lift means includes a pivotal finger, and a power cylinder having a protractable, retractable, piston rod operatively associated with said pivotal finger for pivoting the latter into and out of engagement with said chamfered trailing end of said severed portion of said strip.

11. Apparatus as claimed in claim 4, wherein said strip-application means includes a pivotal finger, and a power cylinder having a protractable, retractable, piston rod operatively associated with said pivotal finger for pivoting the latter into and out of engagement with the leading end of said strip to press and, thereby, effect adhesion of said leading end against said bead ring.

12. Apparatus as claimed in claim 4, wherein said strip-cutting means includes an inclined blade and power cylinder means for shifting said blade across and through said strip for severing and chamfering the latter, and including cutting-guide means having an inclined slot corresponding to the inclination of said blade along which the latter is shiftable, said cutting-guide means including strip-restraining means for engaging said strip to prevent shifting of the latter during chamfering.

13. Apparatus as claimed in claim 12, wherein said strip-restraining means includes a pair of barbed elements spaced on each side of said slot, and a pair of power cylinder means operatively associated with said barbed elements, respectively, for shifting the latter independently of one another endwise into engagement with said strip.

14. In apparatus for applying a tacky elastomeric strip to an outer periphery of a bead ring for a pneumatic tire, said apparatus including:

a. carrier means for detachably supporting a bead ring such that the outer periphery of said bead ring remains exposed;

b. strip-feed means for advancing an elastomeric strip lengthwise to said bead ring;

c. strip-application means for applying and effecting adhesion of a leading end of said strip to the outer periphery of said bead ring;

d. drive means for rotating said carrier means and, thereby, said bead ring and said leading end of said strip relative to said strip-application means;

e. strip-cutting means for severing a portion of said strip trailing said leading end from the remainder of said strip at a length corresponding to the circumference of the outer periphery of said bead ring; and f. strip-pressing means for pressing and effecting adhesion of the severed portion of said strip against the outer periphery of said bead ring during rotation of the latter, said strip-feed means including an improvement comprising a shiftable strip-presenting console, power cylinder means for adjusting the position of said console relative to the external periphery of said bead ring, a frame, a shaft upon which said frame is freely journaled, and means for adjustably turning said frame selectively between successive positions of tangency relative to said carrier means, said strip-presenting console being slidably constrained on said frame for adjustment relative to the latter by said power cylinder means, said means for adjustably turning said frame including a power cylinder having a piston which is coupled with said frame and which when protracted turns the latter in one direction, and rack and pinion means for turning said frame in the opposite direction, said rack and pinion means including a rack operatively associated with said carrier means, coupling means for selectively coupling said rack with said carrier means such that when the latter is rotated, only during selected intervals of rotation of said carrier means, said coupling means converts the rotary motion of said carrier means into translatory motion of said rack, and a pinion gear freely journaled on said shaft, fastened to said frame and meshing with said rack, whereby when said rack is shifted via said coupling means said pinion gear is caused to rotate and turn said frame about said shaft.

15. Apparatus as claimed in claim 14, wherein said strip-presenting console includes a plurality of spaced similar rollers along which said strip is advanced, said rollers being at an elevation which is common to one another, pulley means for reversably advancing said strip to said rollers, bracket means for rotatably supporting said pulley means, and pivot means for pivotably interconnecting said bracket means and said console, said pivot means, when extrapolated, being tangentially aligned both with said pulley means and said rollers of said console and permitting said bracket means to oscillate freely relative to said console.

16. Apparatus as claimed in claim 14, wherein said coupling means includes an electromagnetic clutch operatively associated with said carrier means, said clutch when selectively engaged acting to electromagnetically couple said rack with said carrier means.

17. In apparatus for applying a tacky elastomeric strip to an outer periphery of a bead ring for a pneumatic tire, said apparatus including:
a. carrier means for detachably supporting a bead ring such that the outer periphery of said bead ring remains exposed;
b. strip-feed means for advancing an elastomeric strip lengthwise to said bead ring;
c. strip-application means for applying and effecting adhesion of a leading end of said strip to the outer periphery of said bead ring;
d. drive means for rotating said carrier means and, thereby, said bead ring and said leading end of said strip relative to said strip-application means;
e. strip-cutting means for severing a portion of said strip trailing said leading end from the remainder of said strip at a length corresponding to the circumference of the outer periphery of said bead ring; and
f. strip-pressing means for pressing and effecting adhesion of the severed portion of said strip against the outer periphery of said bead ring during rotation of the latter, said carrier means including an improvement comprising an annular array of bead ring-gripping segments, means for supporting said segments such that the latter are all simultaneously shiftable radially from a common circular condition defining a minimum diameter to a common circular condition defining a maximum diameter, the minimum and maximum diameter conditions corresponding to the range of bead ring-sizes which said carrier means is adapted to carry, and segment-shifting means for shifting said segments all simultaneously radially to and retaining the latter in any diameter condition between said minimum and maximum diameter conditions.

18. Apparatus as claimed in claim 17, wherein said means for supporting said segments includes a hollow shaft, and a circular plate affixed to said hollow shaft, said circular plate including means for guiding the radial displacement of said segments between said minimum and maximum diameter conditions.

19. Apparatus as claimed in claim 18, wherein said segment-shifting means includes a power cylinder having a piston rod coaxially mounted internally of and endwise shiftable relative to said hollow shaft, said piston rod having an elongate extent which is greater than said hollow shaft and which in part protrudes beyond an end of said shaft opposite which said power cylinder is disposed, an end plate affixed to that portion of said piston rod which protrudes beyond said hollow shaft, and a plurality of connecting rods each pivotally connected at one end thereof to said end plate and at the other end thereof to a respective one of said segments, said piston rod when protracted and retracted effecting displacement of said end plate, pivoting of said connecting rods and shifting of said segments.

20. Apparatus as claimed in claim 19, including guide means for stabilizing said end plate as it is displaced by said piston rod, said guide means including a plurality of posts which are parallel to said piston rod and which protrude through respective apertures in said end plate, said posts corresponding in number to the number of said segments.

21. Apparatus as claimed in claim 17, including means for applying a bead ring to said segments, the latter said means including a support upon which said bead ring is manually positionable, a transferring means for removing said bread ring from said support, means for shifting said transferring means to a position in which said bead ring lies in a plane corresponding to the plane of said array of segments, and alignment means for defining the latter said coincident planes and which is engageable by said bead ring when the latter is moved into said coincident planes.

22. Apparatus as claimed in claim 21, wherein said support includes a pair of arcuate plates, and respective power cylinder means for adjusting the radial position of said plates axially above said segments.

23. Apparatus as claimed in claim 21, wherein said transferring means includes magnetic means for gripping said bead ring, said means for shifting said transferring means including a power cylinder having a protractable and retractable piston rod, said piston rod terminating in an end portion upon which is affixed said magnetic means.

24. Apparatus as claimed in claim 21, wherein said alignment means includes a ring-like member, and power cylinder means for elevating said ring-like member to said coincident planes.

25. Apparatus as claimed in claim 24, wherein said power cylinder means includes at least one pair of series connected power cylinders which are independently actuable for elevating said ring-like member from a first position remote from and below said coincident planes to an intermediate position at said coincident planes and further to an extreme uppermost position above said coincident planes to effect a subsequent ejection of said bead ring after the elastomeric strip is fullly applied to said bead ring, said alignment means thus also constituting bead ring-ejection means.

26. In apparatus for applying a tacky elastomeric strip to an outer periphery of a bead ring for a pneumatic tire, said apparatus comprising:
 a. carrier means for detachably supporting a bead ring such that the outer periphery of said bead ring remains exposed;
 b. strip-feed means for advancing an elastomeric strip lengthwise to said bead ring;
 c. strip-application means for applying and effecting adhesion of a leading end of said strip to the outer periphery of said bead ring;
 d. drive means for rotating said carrier means and, thereby, said bead ring and said leading end of said strip relative to said strip-application means;
 e. strip-cutting means for severing a portion of said strip trailing said leading end from the remainder of said strip at a length corresponding to the circumference of the outer periphery of said bead ring; and
 f. strip-pressing means for pressing and effecting adhesion of the severed portion of said strip against the outer periphery of said bead ring during rotation of the latter,
 an improvement comprising strip-supply means for supplying said elastomeric strip to said strip-feed means, said strip-supply means comprising a sheet of elastomeric material, said sheet having a plurality of scored parallel lines formed therein which divide it into and define a plurality of strips which in succession can be torn free from one another, a spool upon which the strips of said sheet are wound in the form of a spiral, means for intermittently unwinding and tearing successive strips from said spool, and means for joining the trailing end of one strip to the leading end of a following strip.

27. Apparatus as claimed in claim 26, wherein said means for joining successive strips to one another includes means for chamfering the leading and trailing ends of the successive strips, and strip-joining means for superpositioning and pressing the mutually associated chamfered ends against one another to effect adhesion of one to the other.

28. Apparatus as claimed in claim 21, wherein the chamfering means includes a pair of spaced inclined blades, and power cylinder means for endwise shifting said blades across and through the successive strips, said strip-joining means including a power cylinder-actuated press member which is engageable with the chamfered ends between said blades.

29. Apparatus as claimed in claim 26, including freely-slidable weighted elements held by respective portions of said strips to generate a selected degree of tension in said strips as the latter are advanced.

30. In apparatus for applying a tacky elastomeric strip to an outer periphery of a bead ring for a pneumatic tire, said apparatus including:
 a. carrier means for detachably supporting a bead ring such that the outer periphery of said bead ring remains exposed;
 b. strip-feed means for advancing an elastomeric strip lengthwise to said bead ring;
 c. strip-application means for applying and effecting adhesion of a leading end of said strip to the outer periphery of said bead ring;
 d. drive means for rotating said carrier means and, thereby, said bead ring and said leading end of said strip relative to said strip-application means;
 e. strip-cutting means for severing a portion of said strip trailing said leading end from the remainder of said strip at a length corresponding to the circumference of the outer periphery of said bead ring; and
 f. strip-pressing means for pressing and effecting adhesion of the severed portion of said strip against the outer periphery of said bead ring during rotation of the latter,
 an improvement comprising a frame, a pivotal arm freely journaled upon said frame, and power cylinder means operatively associated with said pivotal arm for turning the latter, said strip-cutting means and said strip-pressing means being radially shiftable relative to said carrier means and operatively associated with said pivotal arm such that upon pivoting of the latter, toward or away from said carrier means, said strip-cutting means and said strip-pressing means simultaneously move correspondingly into and out of operative association with said carrier means.

31. Apparatus as claimed in claim 30, wherein said frame includes respective tracks directed radially toward said carrier means from different angular positions, said strip-cutting means and said strip-pressing means each including respective shafts which are slidably associated with said tracks and which protrude through respective slots in said pivotal arm, said slots being aligned respective to said carrier means to permit and effect shifting of said shafts radially of said carrier means and along said tracks.

32. Apparatus as claimed in claim 30, wherein said frame includes a lower stationary platform and an upper stationary platform, said power cylinder means being affixed to said lower platform, a track affixed to said lower platform and extending radially toward said carrier means, a shaft slidably supported on said track, a movable plate coupling said shaft and power cylinder means, said shaft protruding through an elongate slot provided in said upper stationary platform, said pivotal arm having an aperture in which an upper free end portion of said shaft is confined, said power cylinder means when actuated effecting shifting of said shaft relative to said elongate slot in said upper stationary platform and a corresponding turning of said pivotal arm.

33. Apparatus as claimed in claim 32, wherein said strip-feed means is pivotably supported upon said shaft, and including rack and pinion means operatively associated with said shaft for turning said strip-feed means into respective tangential positions relative to said carrier means.

* * * * *

UNITED STATES PATENT AND TRADEMARK OFFICE
CERTIFICATE OF CORRECTION

PATENT NO. : 3,909,338
DATED : September 30, 1975
INVENTOR(S) : Jean R. LeBlond, et al.

It is certified that error appears in the above-identified patent and that said Letters Patent are hereby corrected as shown below:

Column 4, line 59, "stip-handling" should read --strip-handling--.

Column 5, line 11, "acutated" should read --actuated--.

Column 5, line 14, "tgo" should read --to--.

Column 5, line 21, "osciallating" should read --oscillating--.

Column 10, line 9, "coaxilly" should read --coaxially--.

Column 14, line 20, "2007" should read --207--.

Column 29, line 18, "comprising" should read --including--.

Column 29, line 59, "21" should read --27--.

Signed and Sealed this thirtieth Day of March 1976

[SEAL]

Attest:

RUTH C. MASON
Attesting Officer

C. MARSHALL DANN
Commissioner of Patents and Trademarks